US010147059B2

(12) United States Patent
Sullivan et al.

(10) Patent No.: US 10,147,059 B2
(45) Date of Patent: Dec. 4, 2018

(54) SYSTEM AND METHOD FOR AUTOMATED CROSS-DOCK OPERATIONS

(71) Applicant: Innovative Logistics, Inc., Fort Smith, AR (US)

(72) Inventors: Patrick Sullivan, Fort Smith, AR (US); Jefferson Maldonado, Fort Smith, AR (US); Shannon Lively, Fort Smith, AR (US); Kerry Jenkins, Fort Smith, AR (US); Jonathan McCormack, Fort Smith, AR (US); Jeremy Sloan, Fort Smith, AR (US)

(73) Assignee: INNOVATIVE LOGISTICS, INC., Fort Smith, AR (US)

( * ) Notice: Subject to any disclaimer, the term of this patent is extended or adjusted under 35 U.S.C. 154(b) by 0 days.

(21) Appl. No.: 15/798,729

(22) Filed: Oct. 31, 2017

(65) Prior Publication Data
US 2018/0121864 A1  May 3, 2018

Related U.S. Application Data

(60) Provisional application No. 62/415,054, filed on Oct. 31, 2016.

(51) Int. Cl.
*G06Q 10/06* (2012.01)
*G06Q 10/04* (2012.01)
(Continued)

(52) U.S. Cl.
CPC ............ *G06Q 10/06* (2013.01); *G06Q 10/00* (2013.01); *G06Q 10/047* (2013.01);
(Continued)

(58) Field of Classification Search
None
See application file for complete search history.

(56) References Cited

U.S. PATENT DOCUMENTS 2,678,139 A   5/1954   Gildersleeve
3,667,635 A   6/1972   Hackney
(Continued)

FOREIGN PATENT DOCUMENTS

CA    2144886 A1   9/1996
CN    203520452    4/2014
(Continued)

OTHER PUBLICATIONS

H&M Bay Deploys RFID solution at cross-docketing distribution center, RFID24-7Com, Mar. 30, 2010.
(Continued)

*Primary Examiner* — Thomas Randazzo
(74) *Attorney, Agent, or Firm* — Katten Muchin Rosenman LLP

(57) ABSTRACT

Disclosed herein is an automated cross-dock management system configured to optimize moves on a cross-dock. The automated cross-dock management system uses inbound manifest data to calculate ordered move instructions for all inbound movable platforms, inbound modular decks, and inbound freight. The ordered move instructions can be assigned to be carried out by manual conveyance vehicles or by automated guided vehicles based upon a plurality of criteria. The automated cross-dock management system is also able to detect damaged freight on the cross-dock using a combination of streams from video cameras.

20 Claims, 15 Drawing Sheets

(51) Int. Cl.
*G06Q 10/08* (2012.01)
*G06Q 10/10* (2012.01)
*G07C 5/08* (2006.01)
*G06Q 10/00* (2012.01)
*G08G 1/017* (2006.01)
*G08G 1/00* (2006.01)
*H04N 7/18* (2006.01)

(52) U.S. Cl.
CPC ..... *G06Q 10/06316* (2013.01); *G06Q 10/083* (2013.01); *G06Q 10/103* (2013.01); *G07C 5/0866* (2013.01); *G06Q 10/087* (2013.01); *G08G 1/017* (2013.01); *G08G 1/205* (2013.01); *H04N 7/181* (2013.01)

(56) References Cited

U.S. PATENT DOCUMENTS

| | | |
|---|---|---|
| 3,938,678 A | 2/1976 | Kern |
| 4,231,695 A | 11/1980 | Weston, Sr. |
| 5,011,358 A | 4/1991 | Anderson et al. |
| 5,454,672 A | 10/1995 | Halpin et al. |
| 5,799,585 A | 9/1998 | Brennan, Jr. et al. |
| 6,529,797 B2 | 3/2003 | Williams et al. |
| 6,575,686 B2 | 6/2003 | Hagenzieker |
| 6,669,089 B2 | 12/2003 | Cybulski et al. |
| 6,698,655 B2 | 3/2004 | Kondo et al. |
| 7,030,760 B1 | 4/2006 | Brown |
| 7,101,139 B1 | 9/2006 | Benedict |
| 7,327,262 B2 | 2/2008 | Motteram et al. |
| 7,603,299 B1 | 10/2009 | Dewey, Jr. et al. |
| 7,739,147 B2 | 6/2010 | Branigan et al. |
| 7,742,745 B2 | 6/2010 | Twitchell, Jr. |
| 7,826,920 B2 | 11/2010 | Stevens et al. |
| 7,991,505 B2 | 8/2011 | Lert, Jr. et al. |
| 8,442,879 B2 | 5/2013 | Dewey, Jr. et al. |
| 8,491,240 B2 | 7/2013 | Baker |
| 8,626,540 B2 | 1/2014 | Peterkofsky et al. |
| 8,731,708 B2 | 5/2014 | Shakes et al. |
| 8,744,884 B2 | 6/2014 | Benda et al. |
| 8,972,045 B1 | 3/2015 | Mountz et al. |
| 9,367,827 B1* | 6/2016 | Lively ............... G06F 17/30312 |
| 2003/0050819 A1* | 3/2003 | Koenigbauer ... G06Q 10/06314 705/7.24 |
| 2005/0071234 A1 | 3/2005 | Schon |
| 2005/0125247 A1* | 6/2005 | Ding .................... G06Q 10/047 705/338 |
| 2006/0015532 A1 | 1/2006 | Mizell |
| 2007/0136079 A1 | 6/2007 | Beykirch et al. |
| 2007/0156491 A1 | 7/2007 | Schuler et al. |
| 2007/0174148 A1 | 7/2007 | Schuler et al. |
| 2007/0279224 A1* | 12/2007 | Branigan ............... G06Q 10/08 340/572.1 |
| 2008/0103944 A1 | 5/2008 | Hagemann et al. |
| 2008/0167817 A1 | 7/2008 | Hessler et al. |
| 2009/0267770 A1 | 10/2009 | Twitchell, Jr. |
| 2009/0293756 A1* | 12/2009 | Hathaway ............... B61B 1/005 104/29 |
| 2010/0108760 A1 | 5/2010 | Eccleston |
| 2010/0241532 A1* | 9/2010 | Biddle .................. G06Q 10/08 705/28 |
| 2011/0274523 A1 | 11/2011 | Petalas |
| 2012/0101956 A1 | 4/2012 | Hyre et al. |
| 2012/0112904 A1 | 5/2012 | Nagy |
| 2012/0191272 A1* | 7/2012 | Andersen ............. G06Q 10/087 701/2 |
| 2012/0239224 A1* | 9/2012 | McCabe ................. B66F 9/063 701/2 |
| 2014/0277691 A1 | 9/2014 | Jacobus et al. |

FOREIGN PATENT DOCUMENTS

| | | |
|---|---|---|
| DE | 2951271 A1 | 7/1981 |
| EP | 2 845 823 A1 | 3/2015 |
| JP | 07-069458 A | 3/1995 |
| KR | 10-2014-0101117 A | 8/2014 |

OTHER PUBLICATIONS

3PL Adds Customer Value with RFID, Sato Eueope, Megatrux, Inc., Rancho Cucamonga, California.

"Maida Napolitano", Contributing editor, Crossdocking: The latest and greatest, Article from Logistics Management, MMH Editorial, Apr. 1, 2010.

K. Choy, et. al., Cross-dock job assignment problem in space-constrained industrial logistics distribution hubs with a single docking zone, Taylor & Francis Online, International Journal of Production Research, vol. 50, Issue 9, 2012, Special Issue: International logistics systems: theory and applications.

G. Miragliotta, et. al., A quantitative model for the introduction of RFId in the fast moving consumer goods supply chain: Are there any profits?, International Journal of Operations & Production Management, ISSN: 0144-3577, Online from 1980, Subject Area: Management Science & Operations.

J Wang, Et. Al., Real-time trailer scheduling for crossdock operations, Transportation Journal 47.2, (Apr. 2008-Jun. 2008): 5(16).

Transmittal; International Search Report; and the Written Opinion of the International Searching Authority for International Application No. PCT/US2015/065775 dated Mar. 30, 2016.

International Search Report and Written Opinion dated Jan. 2, 2018, from the corresponding International Application No. PCT/US2017/059080, 14 sheets.

Extended European search report dated Apr. 23, 2018, for European Patent Application No. 15870857.8, 6 sheets.

* cited by examiner

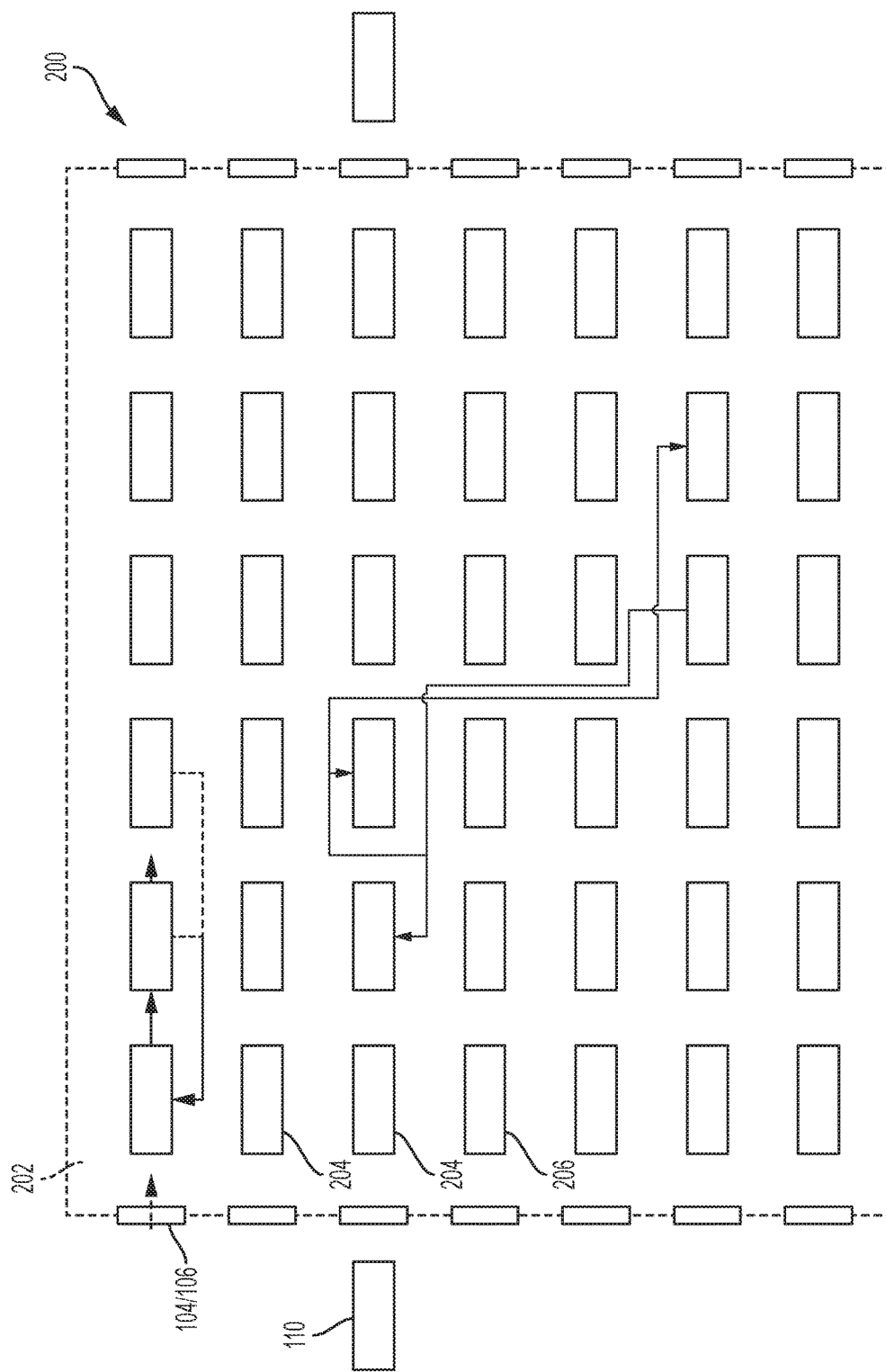

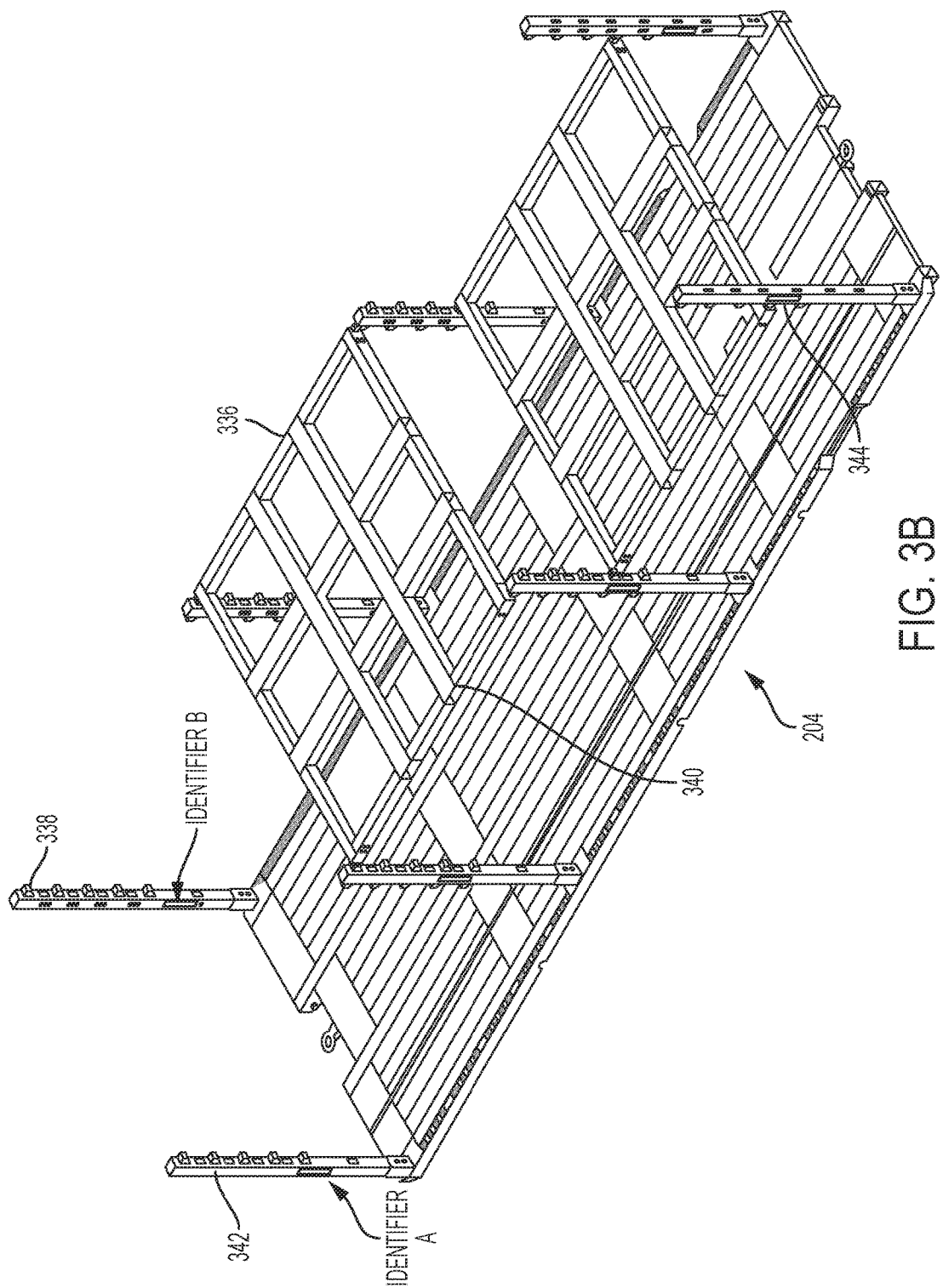

SYSTEM AND METHOD FOR AUTOMATED CROSS-DOCK OPERATIONS

CROSS-REFERENCE TO RELATED APPLICATIONS

The present applications claims priority to U.S. Provisional Application Ser. No. 62/415,054, filed Oct. 31, 2016, the entire content of which is hereby incorporated by reference in its entirety.

TECHNICAL FIELD

The present invention relates to the field of freight, shipping, and dock management; more particularly, to an automated cross-dock management system, method, and/or apparatus; even more particularly, to an optimized and automated cross-dock management system, method, and/or apparatus for use with less-than-truckload carriers.

BACKGROUND

Within the shipping industry exists a segment of transportation that focuses on less-than-truckload (LTL) freight loads, which can vary from a single item to a nearly full truckload. To transport freight originating from a common origin destined for multiple locations around the country or region, LTL carriers often employ a hub-and-spoke network of terminals.

Once freight is picked up, it is brought back to a facility where it is transferred across a dock (a process commonly referred to as "cross-docking"). This process typically involves manually unloading the load (or portion thereof) from one trailer and loading it onto another. An system for improving cross-dock operations is described in U.S. Pat. No. 9,367,827, issued Jun. 14, 2016, the entire content of which is hereby incorporated by reference in its entirety.

In recent years, there have been many improvements in warehouse operations. Specifically, large e-commerce retailers and shipping services have begun to use automated guided vehicles (AGVs) to move freight around warehouses. Typically, these AGVs are lower-cost devices that are designed to move freight placed upon them from a first location to a second location in the warehouse. These AGVs use a simple navigation method using markers and have basic collision sensors to avoid bumping into other AGVs.

However, these AGVs are typically not suited for cross-dock operations, especially in an LTL environment. First, in a cross-dock operation, an AGV may need to convey an entire movable platform (MP) which can weigh up to 24,000 pounds (or more). AGVs currently being used in most warehouses can typically only convey a few hundred pounds at most. Further, most current AGVs can only move in a grid-like pattern whereas cross-dock operations require much more advanced collision avoidance systems because manual workers may also be present.

Additionally, as will be described later, the AGVs may need to perform a variety of functions such as moving MPs, moving decks, and/or moving individual pieces of freight. Current AGVs and cross-dock systems are not equipped to handle and/or calculate these types of moves. What is needed is a cross-dock management system capable of effectively using AGVs to supplement or entirely replace manual moves in a cross-dock environment. Such a cross-dock system must be highly adaptable to handle exceptions, such as AGV recharging or maintenance, and should enable cross-dock operations to be extended to operate 24 hours a day, seven days a week

SUMMARY

The present invention provides an automated cross-dock management system configured to optimize moves on a cross-dock. The automated cross-dock management system uses inbound manifest data to calculate ordered move instructions for all inbound movable platforms, inbound modular decks, and inbound freight. The ordered move instructions can be assigned to be carried out by manual conveyance vehicles or by AGVs based upon a plurality of criteria. The automated cross-dock management system is also able to detect damaged freight on the cross-dock using a combination of video streams from video cameras.

DESCRIPTION OF THE DRAWINGS

These and other advantages of the present invention will be readily understood with the reference to the following specifications and attached drawings wherein:

FIG. 2A depicts an optimized dock according to a first aspect of the present invention.

FIGS. 3A and 3B depicts a movable platform with decks divided into sections and subsections using identifiers.

DETAILED DESCRIPTION

Figure 1:
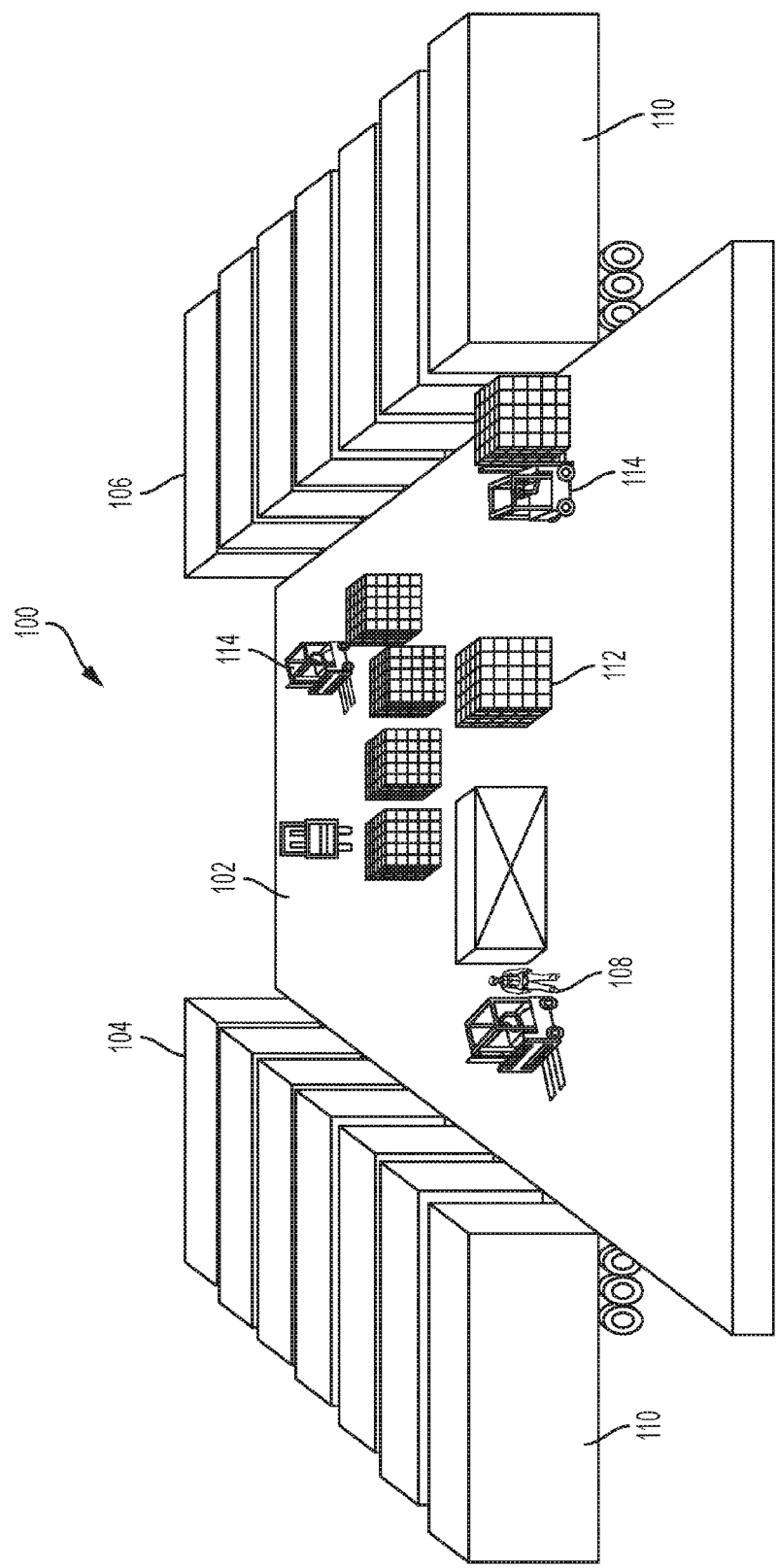
FIG. 1 depicts a perspective view of a typical dock currently used by LTL carriers.

Preferred embodiments of the present invention will be described herein below with reference to the accompanying drawings. In the following description, well-known functions or constructions are not described in detail because they may obscure the invention in unnecessary detail. While the present invention is generally directed to LTL operations for use in the trucking industry, the teachings may be applied to other shipping industries, just as those by air, sea, and rail. Therefore, the teachings should not be constructed as being limited to only the trucking industry. For this disclosure, the following terms and definitions shall apply:

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

As noted above, LTL carriers typically transport freight originating from a common origin destined to many different locations around the country via a system of terminals. Typically, once freight is picked up, the freight is brought back to a facility where it is transferred across a dock 102 (cross-docked), which involves unloading the freight from one trailer and loading it onto another. Freight can move through one or more terminals 100 (e.g., small terminals or distribution centers) in a hub-and-spoke network until the freight reaches its destination terminal and/or is delivered.

In this present invention, freight may be received at its origin via one of several methods: loose pallets, boxes, cartons, crates, drums, barrels, or the like; by MP 204 with decks 336 (FIGS. 3A-3B), an 8'×8' (or similarly sized) platform used for double or triple stacking of freight on a MP 204 by which cargo consisting of loose pallets, boxes, cartons, crates or the like are stacked upon going to either a single destination or multiple destinations; by single MP 204, MP 204 without decks 336 as described in U.S. Pat. No. 9,367,827, issued Jun. 14, 2016 (the entire content of which is herein incorporated by reference), by which decks 336 and cargo consisting of loose pallets, boxes, cartons, crates or the like are stacked upon going to either a single destination or multiple destinations; or by multiple MPs 204 such as in a full truckload, rail container, ocean container, or the like consisting of two or more MPs 204 going to either a single destination or multiple destinations.

In some embodiments, freight having non-standard dimensions may be combined and/or placed in standardized containers having known dimensions. Such standardized containers allow for easier moving of the freight either by a manual move or AGV move. The standardized containers primarily function to make the cargo "AGV-friendly" or "AGV-compatible."

Referring first to FIG. 1, depicted is a typical terminal 100 used by current LTL carriers. As shown, dock 102 is long and narrow. Typically, dock 102 is 60 feet in width or less. An inbound door 104 of dock 102 is used for unloading trailers 110 and a second (outbound) door 106 is used for loading trailers 110. Unloading is generally sequenced in a last in, first out (LIFO) process. Thus, pallets or parcels (freight 112) in the nose (front) of the trailer 110 that need to be unloaded must first have the entire trailer 110 unloaded to provide access to the desired freight 112. As a worker 108 cross-docks freight 112 from the inbound door 104 to the outbound door 106, half of the time is typically spent without any load (i.e., empty carries), which wastes both time and money. Typically freight 112 is conveyed across dock 102 using a conveyance vehicle 114, such as a forklift. The conveyance vehicle, as referred to herein, may be manually operated, remotely operated, or completely autonomous (AGV). Further, at least one load door is required for every load point, but multiple doors may be necessary for multiple schedules to the same load point. Since loading is generally sequenced from the nose to the rear, freight 112 is typically docked in a bay outside the door to allow for co-mingling of the freight 112 on the trailer 110 for the optimum load. This practice creates congestion, wasteful re-handling time, and additional cost. Also, because dock 102 is long and narrow, the maneuverability of workers 108 using conveyance vehicles 114 is severely limited, especially when there is a large quantity of freight 112 on dock 102.

An optimized cross-dock management system 200 in accordance with a first embodiment of the present invention transforms the process for moving LTL freight across the dock 202 by adding a novel combination of mechanics, technology, and automation as depicted in FIG. 2A. To facilitate the optimized cross-dock management system 200, an optimized dock 202 may be employed that is two to three times wider and two to three times shorter than a traditional dock; thus, an optimized dock 202 may more closely resemble a square or large rectangle. Designed properly, an optimized dock 202 may require one-third the number of doors as dock 102 without sacrificing capacity. Alternatively, the optimized dock can 202 be wide enough such that a predetermined number (e.g., 2 to 10, more preferably 3 to 9, most preferably, 5 to 7) of MPs 204 can be spaced out per dock door. The distance between dock doors may be, for example, 12 feet or more. When a MP 204 is removed from a trailer 110 it can be conveyed onto the dock 202.

Further, the use of MPs 204 allows for an entire trailer to be unloaded or loaded and conveyed in less than five minutes, thus increasing efficiency and saving money. MPs 204 may be used to provide optimized load building and planning via real-time data and sensing technology, such as barcodes (2D or 3D), radio-frequency identification (RFID) tags, three dimensional (3D) imaging, Bluetooth low energy (BLE), magnetics, sensor fusion, global positioning system (GPS) tracking, and the like. Preferably, the MP 204 has a height of 4" or less.

The MP 204 may have removable side panels, walls, or other retraining materials, such as ropes, nets, and/or rods that contain, or otherwise restrain, loose pallets or shipment parcels placed thereon. When an enclosed MP 204 is employed (e.g., when walls, panels, or the like are used), the MP's shape is preferably a cube or a rectangular prism, but other shapes are anticipated to meet a specific need or trailer shape, such as a triangular prism or cylinder. A roof panel may also be employed with an enclosed MP 204, but is not required. To facilitate movement, the MP 204 may employ a plurality of wheels, castors, or the like. To facilitate use with a forklift, the MP 204 may comprise cut outs (e.g., a rectangular notch), at the base of each side of the platform, that are configured to receive fork lift prongs from any directions. In certain aspects, the movable platform may even be powered (e.g., motorized). In certain aspects, for example, when an open air trailer is used, the MP 204 may be vertically removed from the trailer using, for example, a crane or other hoisting apparatus.

Figure 3A:
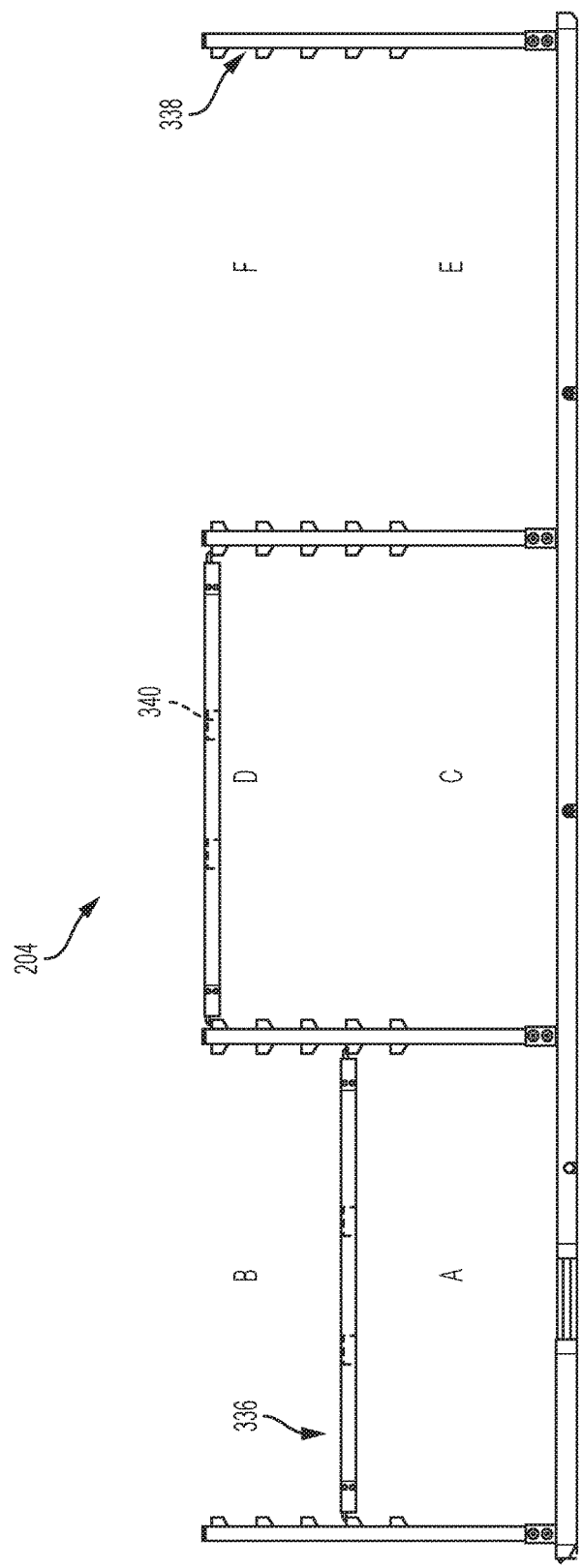

A sample MP 204 compatible with the present invention is depicted in FIGS. 3A (side view) and 3B (perspective view). Features of this MP 204 is described in more detail in U.S. Provisional Application Ser. Nos. 62/414,952, filed Oct. 31, 2016, and 62/414,967, filed Oct. 31, 2016, the entireties of which are hereby incorporated by reference. Herein will be described the features of MP 204 that are relevant to the logistics of the present application. As shown, each MP 204 comprises a plurality of decks 336 which are placed upon vertical posts 338. The height of each deck 336 can be adjusted using a conveyance vehicle 114 by inserting the tines of the conveyance vehicle 114 into slots 340 and moving the deck 336 to a different height on posts 338. Each set of four vertical posts 338 can accommodate one or more decks 336. However, it is preferably that each set of four posts 338 only accommodates a single deck 336 for simplicity of operations and to maximize the space available on MP 204 for freight 112.

If three decks 336 are located on a single MP 204, any freight 112 on the movable platform can be further identified by a section identifier A-F which identifies a more specific location of the freight 112 on the deck 336 of MP 204. Further, the left and right sides of MP 204 may be assigned identifiers 342, such as a color or other ID. Additionally, each post 338 on MP 204 may be assigned a readable tag 344. Assigning this combination of sections A-F, identifiers 342, and tags 344 allows a position on movable platform 204 or deck 336 to be specified with great accuracy. For example, a worker executing a move instruction, as will be described later, can be supplied with a section, a post location, and a side which specifies where freight 112 is to be placed on MP 204. Additionally, the additional granularity provided by this additional identification information provides the necessary information for AGVs 114 to execute move instructions for MPs 204, decks 336, and/or freight 112 as will be described later.

For example, section B can be used to identify all freight located on top of the front most deck 336 above section A and in front of section D. Each section A-F specifies a location (front, center, rear) and a height (ground level or deck) on MP 204. Further, each identifier 342 identifies a side of the MP 204 and each tag 344 identifies a specific post on the MP 204.

As already stated, in some embodiments, the workers 108 may use conveyance vehicles to move the MPs 204 about dock 202. Workers 108 may also be supplemented with AGVs 114. Conveyance vehicles 114, AGVs or otherwise, may include a forklift, towing or pushing vehicle, or other manipulating components, working alone or as a team. Further, each conveyance vehicle 114 may be supplied with remote control functionality allowing for local remote control, on dock 202, or centralized remote control, which is performed at a monitoring facility. Remote control may be useful when moves need to be completed overnight (e.g., to handle a late arrival), allowing a single operator to perform moves from a monitoring facility for multiple terminals 100. This allows terminals 100 to be active 24/7 without requiring a worker 108 at each facility.

As will be described in more detail later, instructions from instruction database 410 can be provided directly to the AGV 114 and the movement of the AGV 114 about dock 202 may be performed by following markers on (or wires in) the floor, or by other navigation sensor-based means, such as vision, magnets, lasers, GPS, infrared sensors, cameras, RFID array 416, or any other known means. It should be obvious to one of ordinary skill in the art that the conveyance vehicles can be supplemented with or upgraded with future navigation technologies still in development.

In some embodiments, AGVs 114 may also be utilized to move decks 336 and/or freight 112 about dock 202 from a first MP 204 to a second MP 204. By moving an entire deck 336 and the freight 112 thereon in a single move, what previously would have taken multiple moves can now be accomplished in a single move. In an automated system, the sector information about the deck 336, the identifiers 342, and the tags 344, all of which are stored in the cross-dock management system 200, can be utilized to assist in the move.

Preferably, the plurality of MPs 204 are the size of the bed of a typical pup trailer (e.g., 28' in length, 100" wide, 100" tall). However, MPs 204 could also take on the form of other lengths, smaller or larger, as long as they fit inside a trailer 110. For example two MPs 13' in length could be deployed inside a pup trailer as well as three MPs 8' in length. Any combination of MP lengths, larger or smaller can be combined to fit inside a trailer. It would also be implied that the combination of MPs 204, large or small, can fit inside any sized trailer, larger or smaller than 28'. This allows an entire trailer to be unloaded at once by simply removing MP 204 from the trailer 110. After the MP 204 has been removed from a trailer 110, it is conveyed to an assigned space 206 as will be described later. As depicted in FIG. 2A, the spaces 206 are arranged in a grid pattern which provides several advantages. First, because an entire trailer 110 can be unloaded quickly, the trailer 110 can quickly be removed from the unloading door 104. Thus, many less unloading and loading doors are needed for cross-dock management system 200. Also, MPs 204 which contain decks 336 or freight 112 that must be exchanged can be placed in spaces 206 next to each other which reduces the movement required of each conveyance vehicle 114. And, each MP 204 can be accessed from all four sides which provides many more routes which reduces congestion (by providing more moving paths) and also allows multiple conveyance vehicles 114 to access the same MP 204 for simultaneous unloading and loading. MP 204 also makes irregular freight 112 easier to handle since it can be loaded onto the movable platform on dock 202 where there is much more room to maneuver than in the trailer 110. Further, since a combination of different types of conveyance vehicles 114 can be utilized, this reduces the number of workers needed to man each dock 202

Figure 2B:
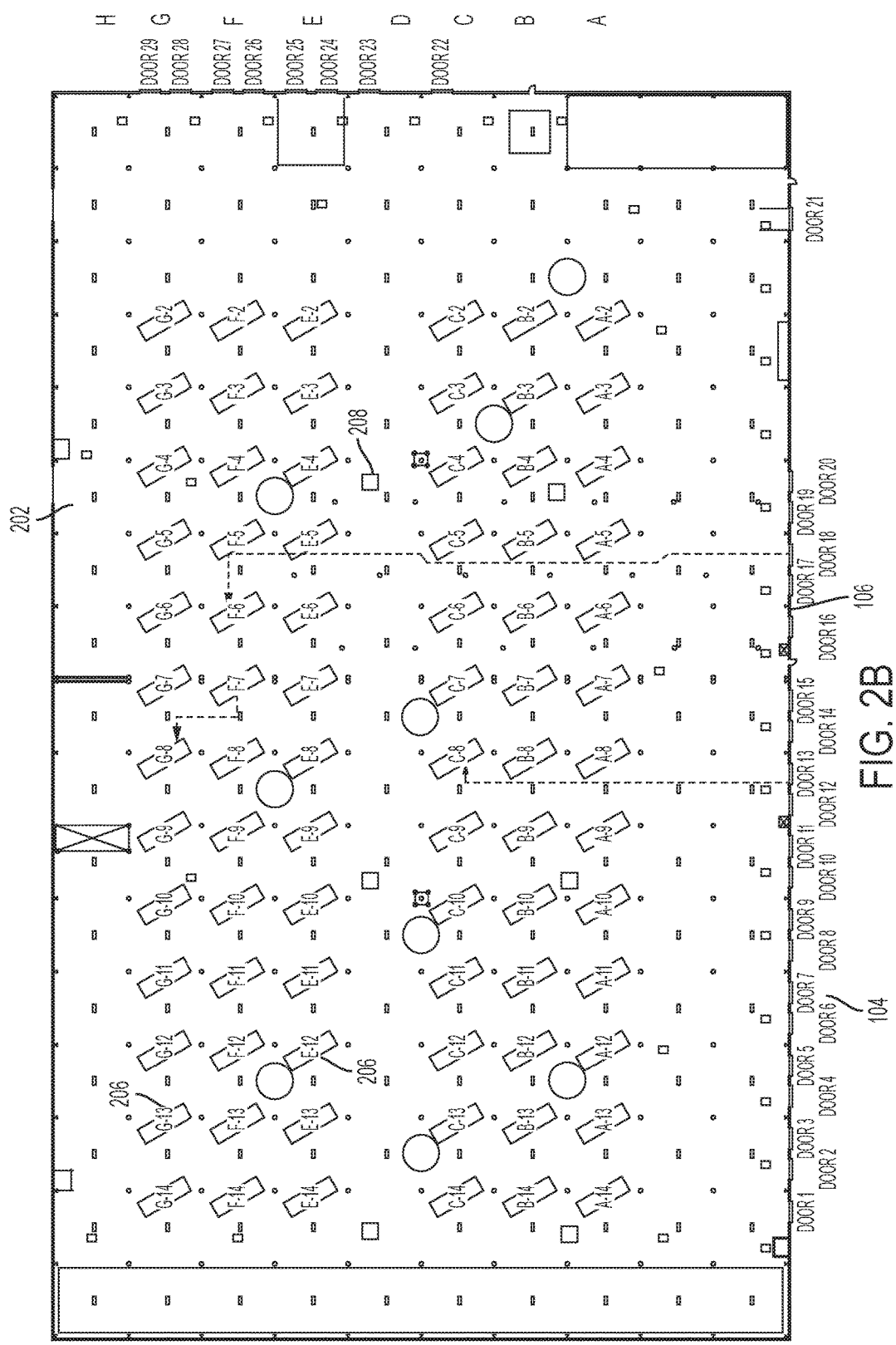
FIG. 2B depicts another optimized dock according to a second aspect of the present invention.

FIG. 2B depicts another embodiment of dock 202 in which spaces 206 are angled 30-45° degrees with respect to the spaces 206 depicted in FIG. 2A. Some terminals 110 have support posts 208, or other obstacles, spaced at regular intervals. These posts 208 may interfere with the grid of spaces 206 depicted in FIG. 2A. The angled spaces 206 facilitate a more efficient conveyance operation in terminals 100 with posts 208 by allowing the conveyance operator to pull straight through the dock 202 to drop off or pick-up the MP 204. This can often be accomplished in one move. In the prior dock layout of FIG. 2A, parking an MP 204 was like parallel parking a car because posts 208 and MPs 204 had to be avoided. A conveyance vehicle 114 would require multiple backwards and forwards moves to get the MP 204 placed into the space 206.

In FIGS. 2A-2B, the spaces 206 are shown using an outline showing where an MP 204 can be placed. The outline of spaces 206 may physically appear on the floor, which is needed to allow workers 108 to correctly position MPs 204. However, in a terminal 100 where all MP moves are carried out by AGVs 114, there is no need for the spaces to be shown on the ground because other navigation techniques, to be described later, can be utilized to place the MPs 204 into spaces 206. In this scenario, the floor of terminal 100 can be reconfigured as needed. For example, if the number of MPs 204 on the floor is low, only a portion of terminal 100 may need to be used and MPs 204 may be confined to certain sections of terminal 100. This "sectoring" allows other areas of the terminal 100 to be utilized for other purposes. For example, a first section of terminal 100 can be designated for MPs 104, a second section could be used for storage, and a third section could be placed off-limits to AGVs 114. This allows the floor-space of terminal 100 to be optimized for daily usage.

Figure 4:
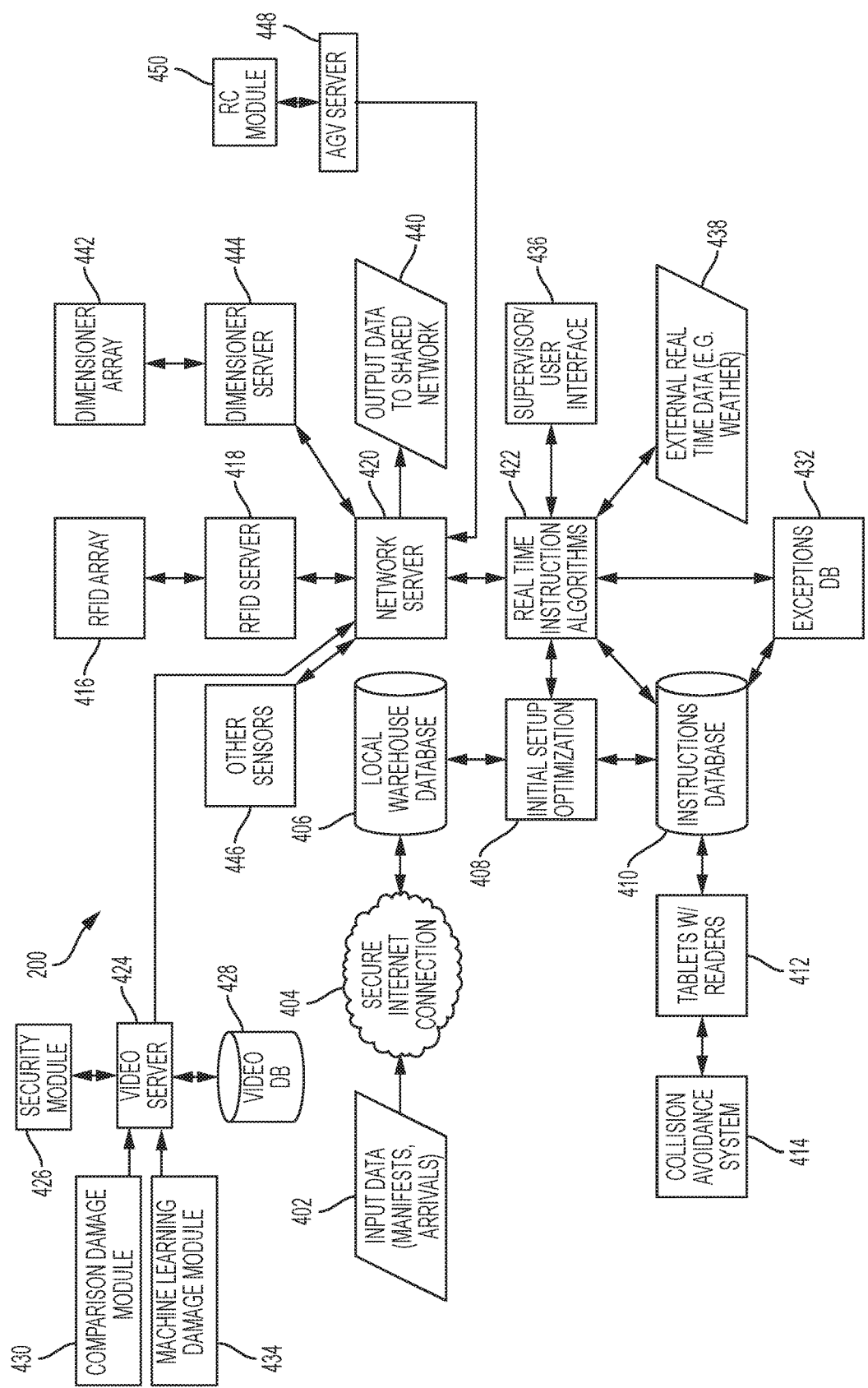
FIG. 4 depicts a system diagram showing the hardware and resources employed during operation of the optimized dock of FIGS. 2A and 2B.

FIG. 4 depicts a system diagram showing the hardware and resources employed by cross-dock management system 200 used to optimize unloading and loading of trailers 110 and movement of MPs 204, decks 336, and freight 112 on dock 202. First, input data 402 (e.g., manifests, arrivals) arrives at cross-dock management system 200 via a secure internet connection 404. Input data 402 provides cross-dock management system 200 with the initial information needed to optimize the loading and unloading of trailers 110 as well as the conveyance of MPs 204, decks 336, and freight 112 across dock 202. One of ordinary skill in the art would recognize that manifest data may include the number of inbound trailers 110; number of inbound MPs 204; number of inbound decks 336; freight 112 dimensions and weight; origin and destination of each MP 204, deck 336, and piece of freight 112; flags indicating if freight is AGV-compatible; etc.

The received input data 402 is stored in a local warehouse database 406 so that it can be utilized by initial setup optimization 408 to determine optimal instructions for the unloading and loading of MPs 204. Specifically, the initial setup optimization 408 is a series of algorithms that utilizes the input data 402 to determine optimal instructions which minimize loading and unloading time; identify which freight 112, decks 336, and MPS 204 require movement and/or no movement; group common destination freight 112, minimize MP 204, deck 336, and freight 112 movement time; reduce empty carries and moves; prioritize certain moves based on service and transit service requirements; reduce travel distance; and optimize the number of workers 108 and/or AGVs 114 required based upon the number of moves. Any of the instructions can manually be overridden by a supervisor or other worker 108 by utilizing supervisor/user interface 436.

Once the instructions are determined, they are stored in instructions database 410. The instructions are classified into two categories: AGV instructions and human instructions. This classification can be based on classification data included in the manifest (e.g., AGV-friendly freight 112).

A first set of instructions specifies moves that can be carried out before daily shipments arrive such as conveyance, MP 204 placement, and/or any other moves which can be used to prepare dock 202 prior to arrival of trailers 110. These moves could be carried out overnight by AGVs 114 or by remotely controlled conveyance vehicles 114. A second set of instructions specifies where each arriving MP 204 is to be placed and what specific freight 112 or decks 336 need to be moved to/from each MP 204.

The instructions specify in which space 206 each MP 204 is to be conveyed and what specific freight 112 or decks 336 need to be moved to/from each MP 204. The instructions are provided to each worker on a tablet 412 wirelessly connected to the instructions database 410. Tablet 412 may be any device having a display that is capable of receiving instructions from instruction database 410. In a preferred embodiment, tablet 412 is a portable communications device with a touch screen and one or means for user input such as a keyboard, barcode reader, RFID reader, etc.

Figure 5:
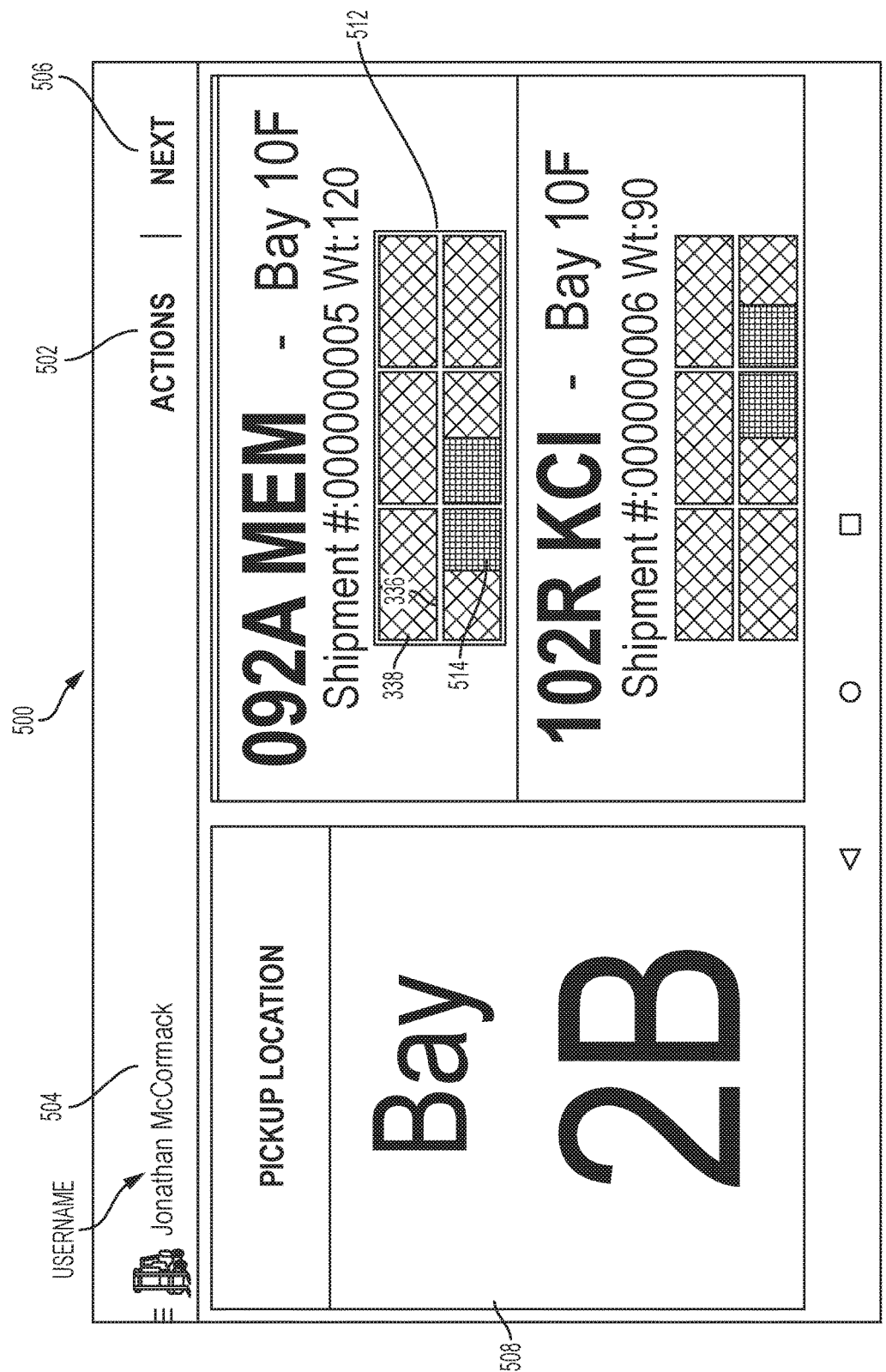
FIG. 5 depicts a sample instruction screen used by a worker to execute a move instruction.

FIG. 5 depicts a sample instruction screen 500 that may be shown on tablet 412 providing an instruction to worker 108. As shown, the upper section 502 of instruction screen 500 indicates the worker's name 504. The upper section 502 may also indicate other actions that can be performed by worker 108, such as next instruction button 506 which worker 108 may utilize to skip the currently shown instruction (e.g., worker detected freight damage). A left section of 508 of instruction screen 500 indicates a pickup location for the move. In the depicted example, the worker 108 is instructed to pick up freight from "Bay 2B" which specifies a particular space 206 on dock 202.

The right section 508 provides the destination information for the freight 112. As shown, the destination information indicates a destination space "Bay 10F." Further, the right section 510 depicts a visual placement for the freight on movable platform 104 using MP visualization 512. MP visualization 512 depicts a side view of MP 204 showing posts 338 and decks 336 in abstract. Essentially, MP visualization 512 depicts MP 204 using a similar view to that of FIG. 3A showing sections A-F. MP visualization 512 is further provided with a color to indicate which side (left/right) of MP 204 that freight 112 should be placed. MP visualization 512 also indicates which post 338 next to which freight 112 is to be placed. Thus, the final destination for freight 112 can easily be highlighted on MP visualization 512 by shading 514. MP visualization 512 provides a simple interface which conveys a great deal of information to worker 108 quickly and efficiently. By viewing MP visualization 512, a worker quickly knows which space 206, deck 336, and post 338 at which the freight 112 is to be placed. It should also be apparent that a similar MP visualization 512 can be provided to a worker 108 for picking up freight 110 in left section 508.

The instructions sent to tablet 412 may also provide an optimized moving path (directions). The instructions provided on tablet 412 may also be supplemented by or replaced by augmented reality devices, such as head mounted displays (HMDs). For example, the tablet 412 may display instructions screen 500 while a HMD provides turn-by-turn instructions or augments the dock 202 with a moving path for worker 108.

Also, the instructions may include moves for entire decks 336 and all the freight thereon if the freight is intended for the same destination. In some embodiments, the instruction may cause the tablet 412 to display additional information including shipment origin, priority moves, destination, weight, dimensions, departure time, due date, unload assignment movable platform dock location and shipment parcel location within the MP 204, and load assignment movable platform dock location and shipment parcel location.

As each instruction (i.e., move) is performed by a worker 108 or an AGV 114, a reader (RFID or barcode) attached to the tablet 412 may be used to verify each move. For example, before a move is completed, a worker 108 first scans the identifier (e.g., barcode, RFID tag) on freight 112 or deck 336 and scans the identifier on the MP 204 or deck 336. Then, the worker conveys the freight 112 or deck 336 to its destination and scans the destination MP 204, deck 336, post 338 and/or freight 112 to verify that the move has been completed. For decks 336, the provided instructions may also include a height of the originating deck 336 and the height at which the deck 336 is to be moved to on the destination movable platform 202. Preferably, the heights at which decks 336 are placed on posts 338 are uniform on each MP 204 which allows all moves to be standardized at each dock 202.

After a move, the worker 108 or AGV 114 is then supplied with the next instruction, preferably, based upon the previous destination in order to reduce overall travel distance. The next instruction may also be based on a priority of the instruction. It should be obvious to one of ordinary skill in the art that MPs 204, decks 336, posts 338, and freight 112 can be labeled with any combination of identifiers such a barcodes, RFID tags, NFC tags, or any other machine readable code.

In some embodiments, each movable platform 204 is equipped with a collision avoidance system 414 which may include a camera, radar sensor, sonar sensor, etc. at a front end (i.e., opposite from the worker) of MP 204. The collision avoidance system 414 can connect to the tablet 412 by a suitable wired or wireless connection such as Wi-Fi or Bluetooth. The collision avoidance system 414 allows a worker 108 to safely maneuver a MP 204 in and out of trailers 110 and across dock 202. The collision avoidance system 114 may be provided with a light source to help the worker during the loading or unloading process.

Additional technologies including, but not limited to, temperature and vibration sensors, light sensors to determine if the trailer door is opened, weight sensors, obstacle detection as described in U.S. Provisional Application Ser. No. 62/414,952, filed Oct. 31, 2016, and a GPS or cellular device for tracking may also be equipped on the MP 204.

As freight 112, decks 336, and MPs 204 are being moved around dock 202, it is important to keep track of the location of everything so it does not end up at the wrong final destination. Equipping each worker 108 with a tablet 412 helps to ensure that each instruction is carried out properly. However, a worker 108 may still move freight 112 or deck 336 without scanning it properly. Thus, the cross-dock management system 200 may utilize other sensors as a backup to tablets 412 as will be described with reference again to FIG. 4.

Such systems also enable AGVs 114 to be deployed instead of or in addition to workers, thus enabling cross-dock management system 200 to be fully automated, if needed. A first example of such a system that may be employed by cross-dock management system is RFID array 416 which preferably comprises a plurality of RFID readers arranged in a grid above dock 202. Each of the RFID readers in RFID array 416 is coupled to an RFID server 418 which is capable of real-time tracking of each MP 204, post 338, deck 336, piece of freight 112, AGV 114, and/or worker 108 located on dock 202. The tracking information from RFID server 418 is periodically or constantly provided to a network server 420 which can be used by real time instruction algorithms 422 to verify that each instruction has been carried out properly. If the real time instruction algorithms 422 detect that any instructions have been carried out improperly or that MP 204, post 338, deck 336, piece of freight 112, AGV 114, and/or worker 108 has moved to an incorrect location, the instructions database 410 can be corrected in real time to correct any errors. Further, if an incorrect or improper move is detected, an alert may be generated to notify appropriate personnel of the error. The incorrect moves can also be stored in the local warehouse database 406 to determine any trends or for later handling. This information could be used to monitor compliancy or malfunctioning AGVs 114.

The RFID tags used in combination with the present invention can store data indicative of, for example, shipment origin, destination, weight, cube, groupings, AGV-compliancy, dimensions, number of shipment parcels, due date, etc. or may simply indicate a tracking number. The RFID tag and any associated RFID reader may be configured to work using one or more RFID technologies, including, without limitation: (1) a Passive Reader Active Tag (PRAT) system; (2) an Active Reader Passive Tag (ARPT) system has an active reader, which transmits interrogator signals and also receives authentication replies from passive tags; and (3) an Active Reader Active Tag (ARAT) system uses active tags awakened with an interrogator signal from the active reader. A PRAT system has a passive reader that only receives radio signals from active tags (e.g., battery operated, transmit only). The reception range of a PRAT system reader can be adjusted from 1-2,000 feet, allowing flexibility in applications such as asset protection and supervision. A variation of the ARAT system could also use a Battery-Assisted Passive (BAP) tag which operates like a passive tag, but has a small battery to power the tag's return reporting signal. For example, passive ultra-high frequency (UHF) RFID tags may be used to identify, locate and track items within the dock and/or yard. Suitable UHF RFID tags, and associated RFID readers. While RFID is generally described herein, other technologies may be used in addition to, or in lieu of, RFID to facilitate tracking of the movable platforms and/or shipment parcel(s), such as near field communication ("NFC").

Cross-dock management system 200 may also include a video server 424 also in communication with network server 422. A first function of video server 424 is security which is handled by security module 426. Preferably, video server 424 is capable of receiving video feeds from each device on dock 202 equipped with a video camera. For example, dock 202 may be equipped with a standard security system found at most terminals 100 used for monitoring theft and facility access. The video feeds from one or more of the security cameras in the security system could be supplied to video server 424. Other video sources may include video feeds from cameras mounted on conveyance vehicles or AGVs 114 (e.g., part of collision avoidance system 414). And, as will be discussed later, video or camera information acquired by dimensioner array 442 may also be monitored by video server 424.

Security module 426 may monitor all of the aforementioned described video feeds and detect movement to create alerts for security personnel. Further, each time an alert occurs, security module 426 may store the video associated with the event in video database 428.

The various described video feeds may also be utilized to provide damage identification. A comparison damage module 430 may be utilized to detect damaged freight 112 by comparing each piece of imaged freight 112 to previous images of the same freight 112 acquired at an earlier point in time (e.g., earlier in the day, at another terminal 110, at pickup, etc.) using a difference algorithm to determine changes in freight 112. If any significant changes are detected in freight 112 (e.g., above a certain change threshold), the comparison damage module 430 generates an exception which triggers a review of the freight 112 by a supervisor or other personnel. As will be described in more detail later, all exceptions are stored and classified in exceptions database 432.

The video feeds may also be monitored by a machine learning damage module 434. Machine learning damage module 434 uses machine learning to detect damage in the video feeds. For example, the machine learning damage module 434 may initially be supplied with various examples of freight damage images. Artificial intelligence can then be utilized to categorize and generalize the initial input information to determine damage and generate exceptions. As exceptions are corroborated by human review, the AI of machine learning damage module 434 modifies its behavior appropriately. Over time, the machine learning damage module 434 becomes more sophisticated at detecting damage to freight 112 and would be capable of detecting damage in hard to image areas, such as on the top of MP 204 which is out of sight of workers 108. Similarly, if any damage is detected by machine learning damage module 434, an exception is generated which is stored in exceptions database 432 for further review.

The real time instruction algorithms 422 are able to handle any exceptions or other problems that may occur in real time. For example, the real time instruction algorithms 422 are provided with a supervisor or worker interface 436 which allows a supervisor to prioritize certain MPs 204 or freight 112. If a supervisor receives a telephone call or communication indicating that certain freight 112 has been prioritized or must reach a new and different final destination, the supervisor can use worker interface 436 to provide this information to cross-dock management system 200. The real time instruction algorithms 422 then computes an exception which is stored in exception database 432 and revised instructions are provided to instruction database 410. In this manner, the workflow of workers 108 and AGVs 114 on dock 202 is not interrupted. The workers 108 and AGVs 114 are simply provided new and/or updated instructions to carry out.

Real time instruction algorithms 422 can also receive input from external real time data 438 such as weather, trailer delays, etc. For example, another terminal 100 may inform the cross-dock management system 200 of trailer delays or breakdowns. In another example, the real time instruction algorithms 422 may be notified of external real time data 438 including weather events or road closures which will affect either inbound and/or outbound trailers 110.

Cross-dock management system 200 may also provide output data 440 to a shared network to other terminals 100. In this manner, all of the cross-dock management systems 200 among the various terminals 100 are linked together. The sharing of output data 440 has many benefits. For example, if a certain geographical region has been hit by a natural disaster, MPs 204 can be rerouted to different terminals 100 to circumnavigate the area affected by the natural disaster. Thus, having multiple terminals 100 that are geographically distributed can be turned into an advantage by allowing the rerouting of trailers 110 in real time. In some embodiments, new destination instructions can be communicated to mobile trailers 110 via a wireless communication interface such as cellular, radio, etc.

The freight 112 carried on each MP 204 is constrained by the trailer 110 that it must fit into. For example, most pup trailers are not allowed to convey more than 24,000 pounds. And, the width, length, and height are constraints that the pallets and parcels cannot exceed. Input data 402 generally contains the weight of each piece of freight 112. However, in LTL shipping, the dimensions of freight 112 can vary greatly (e.g., long and narrow or cylindrical). Therefore, the cross-dock management system 200 may also employ a dimensioner array 442 which monitors the dimensions of each MP 204 to ensure that it does not exceed the interior size of the trailer 110. Each space 206 on the dock 202 may be provided with its own dimensioner or one dimensioner may cover multiple spaces 206. Preferably, a dimensioner is an imaging device capable of monitoring the boundaries of the MP 204 as well as the height of the decks 336 and freight 112 placed upon the MP 204. The information from the dimensioner array 442 is collected and stored by dimensioner server 444. And, as previously described, dimensioner server 444 may provide any video data to video server 424 for further analysis.

The information collected by dimensioner server 444 may be utilized by the real time instruction algorithms 422 if it is detected that a particular MP 204 has exceeded acceptable constraints to length, width, and height. If any excess is detected, the real time instruction algorithms 422 provide new instructions to instructions database 410. Also, the dimensioner server 444 can be used to detect where irregular shaped freight 112 can be placed. For example, certain LTL shipments, such as ladders, could be placed on top of a MP 204 as long as the resulting load does not exceed a predetermined height and/or weight requirement.

The dimensioner array 442 can also be used to track the length, width, and height of the freight 112 placed on decks 336 to ensure it does not exceed a certain size limit. If it is determined that the size limit is exceeded, the real time instruction algorithms 422 can calculate new instructions to alleviate any problems.

As with any of the other described systems, such as the RFID server 418, the dimensioner server 444 also generates exceptions if any irregularities on an MP 104 are discovered. For example, if the dimensioner server 442 detects that the width or length of an MP 204 is irregular, this may indicate that freight 112 is placed incorrectly or is in danger of falling off MP 204 or decks 336.

Dimensioner array 442 may utilize any combination of known or future technologies capable of determining the outer dimensions of an object. For example, dimensioner array 442 may include vision systems such as HD video cameras or infrared laser scanners having low tolerances (e.g., ½" or less). The dimensioner array 442 may scan an entire MP 204, a single deck 336, or individual pieces of freight 112. The dimensioner array 442 can provide real time dimension data as freight 112 is conveyed. Each space 206 may be outfitted with its own dimensioner. Or, in other embodiments, a dimensioner may be outfitted on one or more drones which can cover multiple spaces 206.

The weight of the freight 112 placed on deck 336 must also be tracked because each deck 336 is assigned a weight limit which is constrained by the amount of weight to be placed on posts 338. The weight of decks 336 can be tracked using multiple means. For example, the conveyance vehicles or AGVs 114 used to move decks 336 may be outfitted with weight sensors (e.g., in the tines) that are able to detect the amount of weight being moved. The real time instruction algorithms 422 can then utilize this data to verify that an upper weight limit has not been exceeded for each deck 336 or to calculate new instructions.

Other sensors 446 may also be utilized to monitor MPs 204. For example, each space 206 may be provided with a scale or other weight measuring device to ensure that the MP 204 does not exceed a certain weight limit. The weight sensors may also be pressure sensitive to determine if the load on each movable platform is distributed equally or logically (e.g., to place more weight on the end of MP 204 to prevent possible sag in the middle). The real time instruction algorithms 422 can use the data from other sensors 446 (e.g., temperature, humidity) to make any necessary corrections to instructions database 410. It should be apparent to one of ordinary skill in the art that sensors may be added or deleted from cross-dock management system at any time simply by installing or removing the sensors and adapting the real time instruction algorithms 422 appropriately.

Cross-dock management system 200 also incorporates an AGV server 448 which is used to aid the navigation of each AGV 114 as well as monitor its real time location and status. For example, the AGV server 448 may utilize position information gathered by RFID server 418 to determine if each AGV 114 is in its correct location on dock 202. The AGV server 448 can also be utilized to network all AGVs 114 so that each AGV 114 is aware of all AGV locations in real time. AGV server 448 may also be utilized to calculate the paths required for each AGV 114 to execute move instructions from instructions database 410 and to verify that each instruction is correctly performed.

AGV server 448 also incorporates remote control (RC) module 450 which allows any AGV 114 to be remotely controlled as has already been described. Thus, AGV server 448 provides an interface which allows AGVs 114 to be automated and or remotely controlled.

If multiple AGVs 114 are used on dock 202, the real time instruction algorithms 422 can also take into account the cycling of AGVs 114 that must occur. That is, each AGV 114 will eventually need to be recharged, refueled, or be decommissioned for maintenance. In those instances, the real time instruction algorithms 422 would reallocate moves to new AGVs 114 or temporarily assign workers if no additional AGVs 114 are available. In this manner, the workflow on the dock 202 is not interrupted.

The AGVs 114 may each utilize different guidance systems or each AGV 114 may utilize one or more different guidance methods in isolation or in combination. For example, the AGVs 114 tasked with moving MPs 204 may only need to use a much simpler guidance method such as a combination of guide tape and natural feature navigation, ceiling tag (or other visual marker) navigation, infrared sensors, marker grid navigation. Infrared navigation offers the advantage that it is not interrupted by interference from visible lights. Passive infrared tags placed throughout the dock 202 may indicate a specific location on dock 202. AGV navigation can be supplemented by other navigation techniques such as odometry, active RFID, passive RFID, and/or SLAM (simultaneous location and mapping).

AGVs 114 tasked with moving decks 336 or individual pieces of freight 112 would require the use of one or more sophisticated guidance methods such as laser target navigation, inertial navigation, vision guidance, and/or geoguidance. A properly setup AGV guidance system would allow for multiple improvements within cross-dock management system 200. First, a fully (or mostly) automated AGV system would have much less downtime than one staffed solely by workers 108 because no rest or stops would occur. Further, because the navigation is very precise, the distance between spaces 206 could possibly be reduced, allowing even more spaces 206 to be placed on dock 202.

The AGVs 114 may also be modular as has already been described. For example, each AGV 114 may be outfitted with a video camera to supplement the video gathered by video server 424. The AGVs 114 may also be able to receive modular attachments to perform other functions such as cleaning (e.g., vacuum or broom attachment) or placing securement (e.g., shoring beams).

Figure 6:
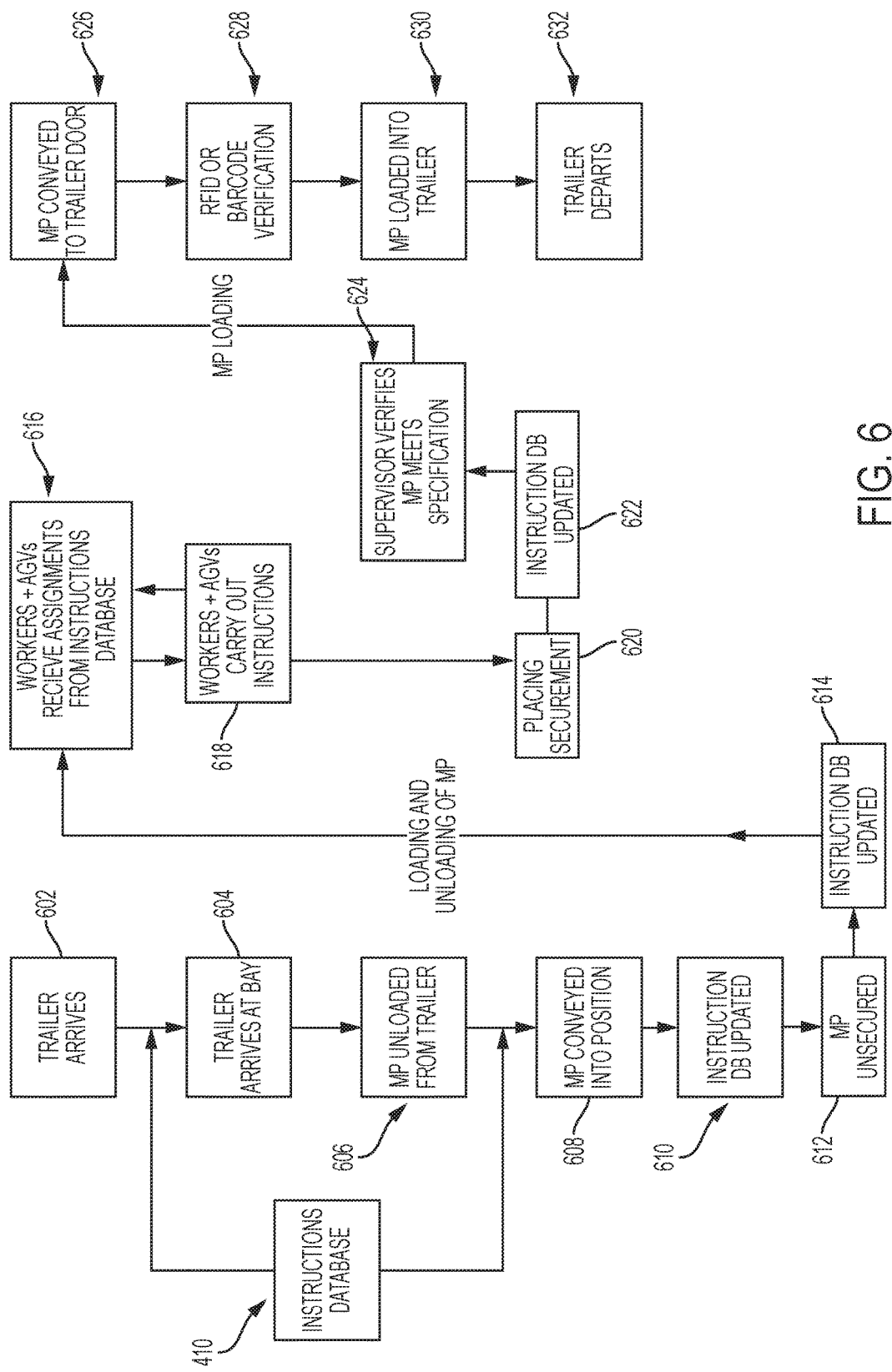
FIG. 6 depicts a flowchart showing the steps used in unloading and loading a movable platform.

For illustration purposes, the steps utilized to unload and load MPs 204 on a trailer 110 will be described in detail using the flowchart of FIG. 6 referencing the docks 202 shown in FIG. 2A or 2B and the various components of cross-dock management system 200 shown in FIG. 4. First, an inbound trailer 110 containing a MP 204 arrives at the terminal 100 in step 602. The trailer 110 is then directed to a particular door in step 604 using instructions retrieved from instructions database 410. The MP 204 is then unloaded from the trailer in step 606 and scanned by a worker using tablet 412. Also, at this point, the RFID array 416 will have scanned any RFID tags contained on the MP 204 since it is now located on dock 202. If the RFID array 416 identifies an RFID tag or tags that should not be present (e.g., not in the manifest data), an exception is generated so that the correct destination of the freight 112 can be determined. This allows misplaced freight 112 to be identified much earlier during transmission of the cargo.

Using the instructions provided by instructions database 410, the MP 204 is then conveyed into its optimized space 206 on dock 202 in step 608. The worker 108 verifies that the MP 204 has been properly moved by scanning an identifier associated with the optimized space 206 along with any of the identifiers provided on MP 204 in step 610. Alternatively, or in addition, the RFID array 416 or other sensors 446 may also be utilized to verify that the MP 204 is in the optimized space 206.

Any securement, such as shoring beams or cargo straps, are then removed from MP 204 in step 612. Step 612 can be performed manually by workers 108 or by an AGV 114 as has already been described. After it is verified that all securement has been removed in step 614, the unloading/loading of MP 204 commences.

At this point, workers 108 are provided with the worker instructions and AGVs 114 are provided with AGV instructions from instructions database 410 in step 616. For each MP 204, the workers 108 and AGVs 114 carry out all assigned moves for the MP 204 in step 618. The specifics of step 618 as to how specific instructions, such as deck or freight movements, are carried out by AGVs 114 will be described with reference to FIGS. 7A, 7B, and 8 later.

The instructions carried out by the workers 108 and AGVs 114 in step 618 can be classified as either a freight move (moving a single parcel or pallet) or a deck instruction (moving decks 336). Deck instructions are advantageous because what previously would have taken several freight moves can now be accomplished in a single deck move. Also, because the freight on the deck 336 is not touched, there is far less likelihood that the freight on deck 336 will become damaged during a deck move. With decks 336, it is possible that freight placed thereon is only handled individually at the origin and destination docks 202.

After all instructions for MP 204 have been carried out, securement must be placed in step 620 (either manually or using an AGV). After the cross-dock management system 200 is notified that the securement has been placed in 622, an alert is generated to notify the supervisor (or similar personnel) that the MP 204 is ready to be inspected. In step 624, a supervisor verifies that MP 204 meets all specifications and that securement has been placed properly. For example, the supervisor may check to see if any freight 112 has been damaged.

Next, using instructions retrieved from instructions database 410, secured MP 204 is conveyed to a particular door to a waiting, empty trailer 110 in step 626. It should be noted that since a MP 204 can be quickly unloaded and unloaded as has been described, the empty trailer 110 does not have to wait at dock 202 and instead can wait in a yard. Then, when the MP 204 is ready to be loaded (e.g., after steps 624 or 626), the correct trailer 110 in the yard can be notified and assigned a door to drive to for loading. Thus, it should be apparent that this provides a significant advantage over traditional LTL methods at which trailers generally have to stay at the door for long periods while they are unloaded or loaded. The cross-dock management system 200 of the present invention only requires the presence of trailers 100 at doors if a MP 204 is being unloaded or loaded.

Before MP 204 is loaded into trailer 410, a worker scans an identifier associated with MP 204 along with an identifier associated with the trailer 110 or door in step 628. This process can also be automated using RFID array 416. Step 628 associates the outbound MP 204 with a particular trailer and creates new manifest data that can be provided to the next terminal 100.

The MP 204 is then loaded onto the trailer 110 in step 630 and the trailer 110 departs in step 432. Steps 602-632 are repeated for each inbound MP 104 on dock 202.

Figure 7A:
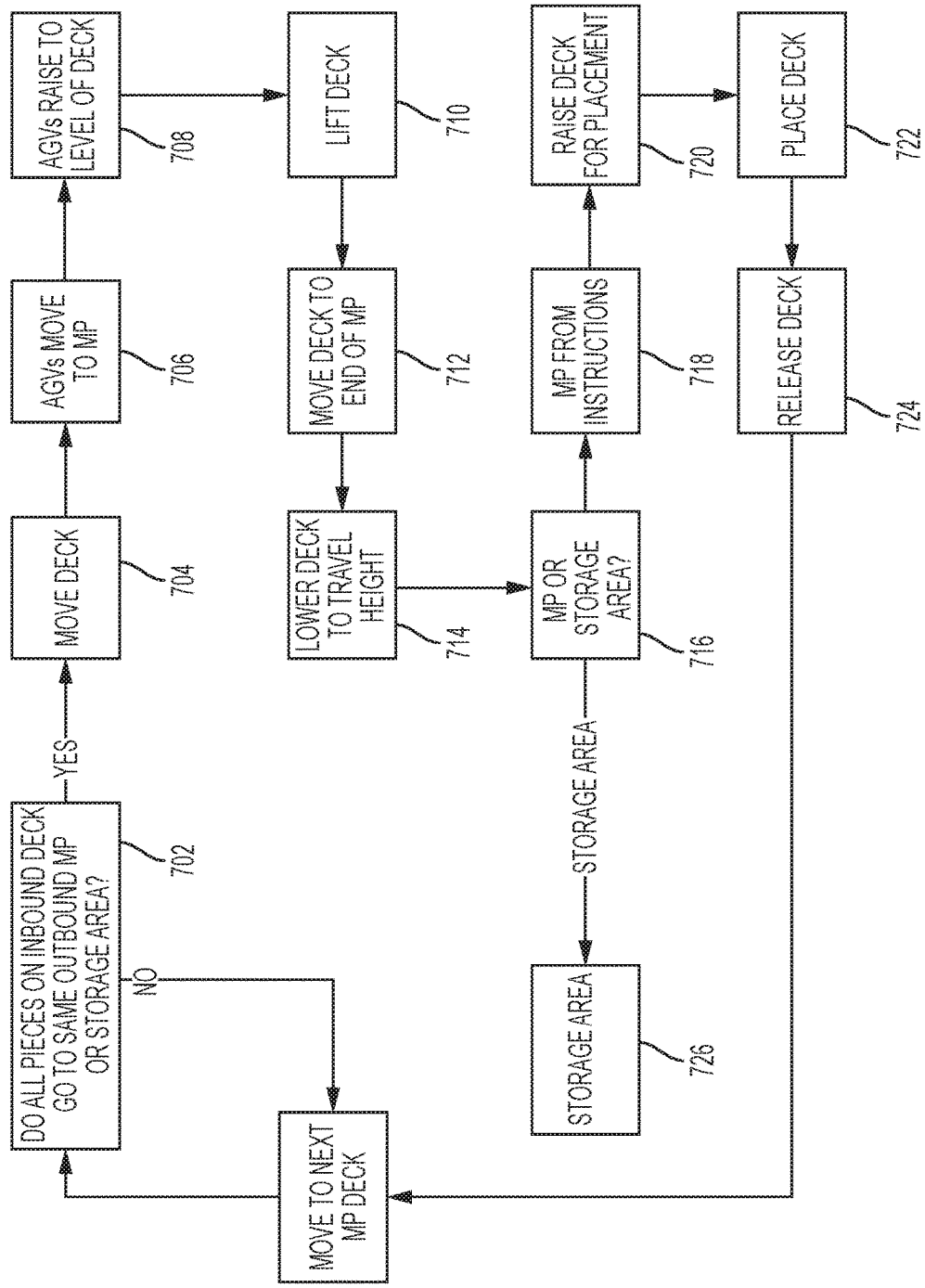
FIG. 7A depicts a flowchart showing the steps used to move a deck using a pair of AGVs.

The steps utilized for moving decks 336 with a pair of AGVs 114 in a deck instruction will be described with reference to FIG. 7A. It is first determined in step 702 if all freight on a particular deck 336 is destined for the same outbound MP 204 or storage area (to be described later). If the determination is positive, the beginning of the move of deck 336 is started in step 704. The AGVs 114 utilized to move deck 336 in this described method are pairs of AGVs 114 which engage the sides of decks 336 in unison as will now be described. First, the AGV team is initiated and moves into position on the sides of deck 336 which is to be moved in step 704 in accordance with the provided deck instruction. Each AGV 114 then positions itself to the level of the deck 336 to be moved in step 706. As has been explained, the height of each deck 336 on each MP 204 is known (e.g., from the manifest data or other calculated instructions) and this information is provided in the deck instruction. Each AGV 114 then engages deck 336 on each side in step 708. If deck 336 does not include slots 340, other gripping means may be utilized for the AGV 114 to attach to deck 336 (e.g., deck 336 can be lifted from beneath).

Each AGV then lifts deck 336 above posts 338 in step 710. Deck 336 is longitudinally conveyed to the end of MP 204 in step 712. At this point, deck 336 is lowered to travel height by the AGVs 114 (e.g., to prevent toppling) in step 714. The supplied deck instruction includes a destination for the deck 336. As previously mentioned, the deck 336 may be conveyed to (a) another MP 204 or (b) a storage area as shown in decision step 716. If the destination is another MP 204, deck 336 is conveyed to the appropriate end of a destination MP 204 in step 718. The AGVs 114 then raise deck 336 to the appropriate height for placement in step 720 and then lower deck 336 onto posts 338 in step 722. Deck 336 is then released in step 724 at which point the AGVs 114 are available for the next move. Alternatively, if the destination for the deck 336 is a storage area after step 716, the AGVs 114 convey the deck 336 to the storage area in step 726.

Figure 7B:
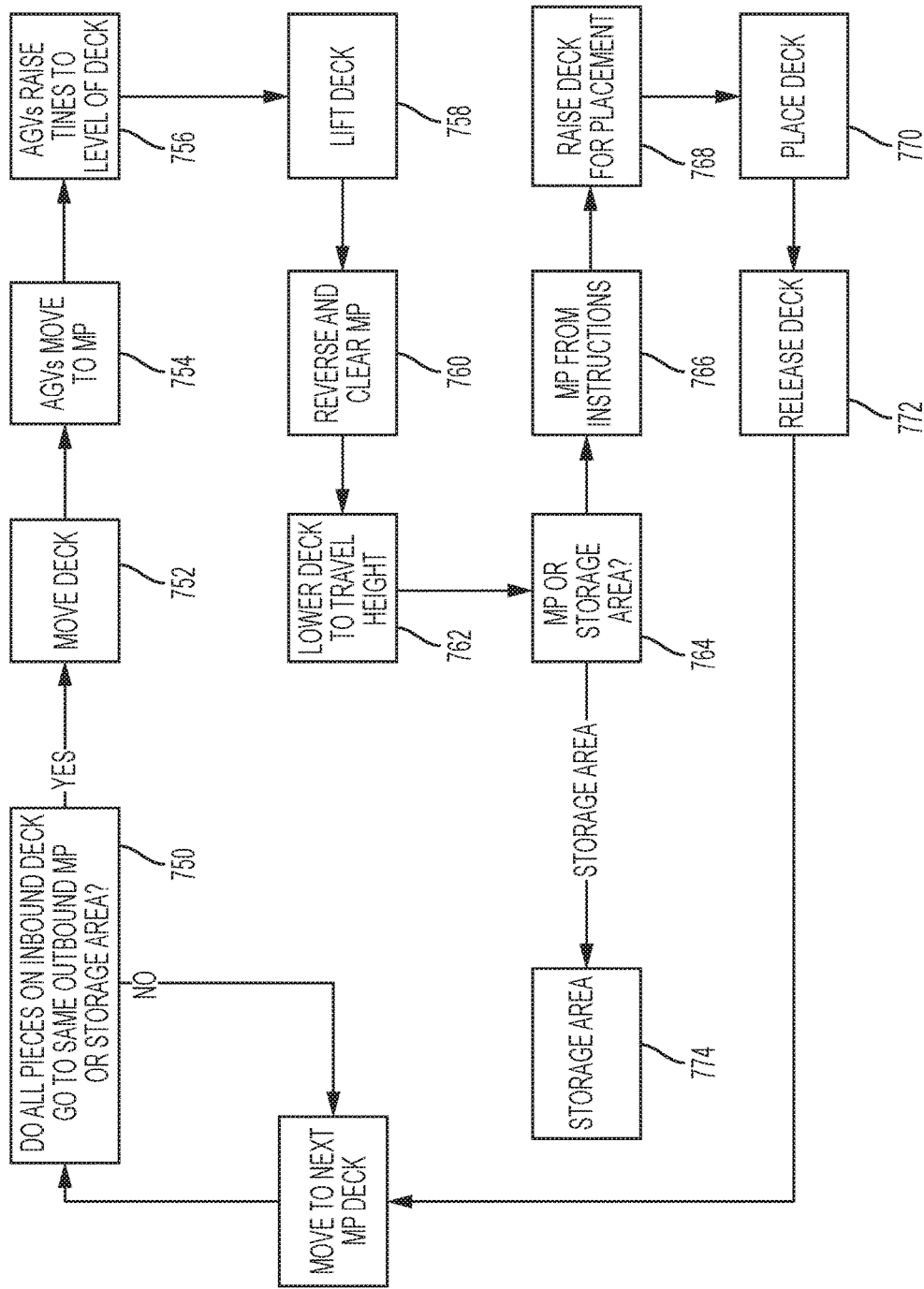
FIG. 7B depicts a flowchart showing the steps used to move a deck using a single AGV.

The steps utilized for moving decks 336 with a single AGV 114 having a pair of forklift tines will now be described with reference to FIG. 7B. It is first determined in step 750 if all freight on a particular deck 336 is destined for the same outbound MP 204 or storage area. If the determination is positive, the beginning of the move of deck 336 is started in step 752. First, the AGV 114 is initiated and moves into position at deck 336 which is to be moved in step 754 in accordance with the provided deck instruction. The AGV 114 then positions itself to the level of the deck 336 to be moved in step 756 and raises its tines in step 756. As has been explained, the height of each deck 336 on each MP 204 is known (e.g., from the manifest data or other calculated instructions) and this information is provided in the deck instruction. The AGV 114 then slots 340 in deck 336 and lifts deck 336 in step 758.

AGV 114 reverses direction until deck 336 clears posts 338 in step 760. At this point, deck 336 is lowered to travel height by the AGV 114 (e.g., to prevent toppling) in step 762. The supplied deck instruction includes a destination for the deck 336. As previously mentioned, the deck 336 may be conveyed to (a) another MP 204 or (b) a storage area as shown in decision step 764. If the destination is another MP 204, deck 336 is conveyed to the appropriate location of a destination MP 204 in step 766. The AGV 114 then raises deck 336 to the appropriate height for placement in step 768 and then lower deck 336 onto posts 338 in step 770. Deck 336 is then released in step 772 at which point the AGV 114 is available for the next move. Alternatively, if the destination for the deck 336 is a storage area after step 764, the AGV 114 conveys the deck 336 to the storage area in step 774.

Figure 8:
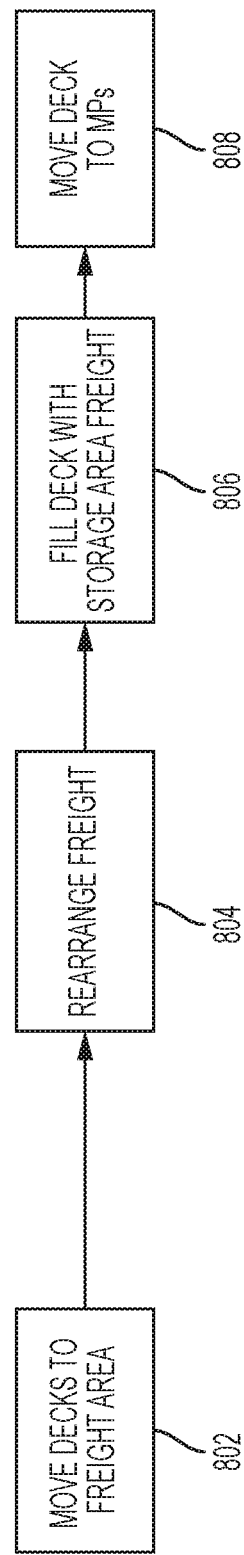
FIG. 8 depicts a flowchart showing the steps used to execute freight instructions.

Referring now to FIG. 8, described is a process that occurs when the initial setup optimization 408 determines that a plurality of decks 336 can be more optimally rearranged to direct freight 112 to its proper destination. For example, the initial setup optimization 408 may determine, based on the manifest data, that the freight on one or more decks 336 can be more optimally rearranged to increase the capacity utilization of trailers 110. This process may only occur if the initial setup optimization 408 determines that a predetermined number of decks 336 can be rearranged, thus making rearranging freight 112 worthwhile.

First, workers 108 or AGVs 114 are utilized to move the decks 336 to be rearranged to a freight area in step 802. The rearranging is preferably done in a separate area of the dock 202 away from spaces 206 because of the more cautious moves required when moving freight 112. After all the decks 336 have been placed in the freight area, the freight 112 on decks 336 is rearranged according to instructions calculated by initial setup optimization 408 in step 804. Next, in order to make use of any leftover space on decks 336, freight 112 from the storage area may be moved to empty spaces on decks 336 in step 806. The decks 336 can then be placed on MPs 204 in step 808.

It is contemplated that one or more different types of AGVs 114 may be utilized in combination with the present invention. For example, a first type of AGV 114 may be utilized to move MPs 204 in/out of trailers 110 and onto dock 202. These AGVs 114 may require simpler construction than others because they only need to hook onto MPs 204 and move them around dock 202.

A second type of AGV 114 may be utilized to execute deck instructions or, in certain environments, single freight instructions as described with reference to FIG. 8. With regards to moving decks 336, this second type of AGV 114 could operate alone or in pairs to move decks 336 about dock 202 as has been described in FIGS. 7A and 7B. If in pairs, a first AGV 114 may act as a master AGV and be in communication with cross-dock management system 200 to receive instructions and carry out orders. The second AGV 114 would be controlled by the master AGV and function as a slave AGV. The slave AGV would be less costly as it would not require all of the features and communication equipment of the master AGV.

A third type of AGV 114 could be utilized to execute single freight instructions, primarily (moving of single freight 112 from a first MP 204 to a second MP 204). Since these AGVs 114 would only be responsible for moving smaller freight 112 (less than a full deck 336), they would be less expensive to produce and maintain. They would also require a much smaller footprint than the first or second type of AGV 114 described above. It should be obvious that the less space that is taken up by AGVs 114 on the dock 202, there is less potential for collisions and other mishaps. As an example, these AGVs 114 may simply have a weight bearing platform with automated rollers on top. The AGVs 114 could use a centralized system of rollers to pick up and drop off freight 112. Such AGVs 114 may be useful for long haul movements such as moving freight from dock 202 to a storage area and vice versa.

However, it is also possible for a single type of AGV 114 to execute all of the moves required by the present invention. Such an AGV may potentially be more costly, but maintenance and other costs could be kept to a minimum because different systems/sets of AGVs 114 would not have to be maintained across multiple docks 202.

Each deck instruction contains the location of the source deck 336 and a location of the destination MP 202. Further, the deck instruction also includes the height at which the source deck is located. As already stated, the heights at which decks 336 are placed on posts 338 are preferably standardized. Therefore, each deck height can be assigned a unique identifier (1–x), similar to the section identifiers. Thus, the sections A-F and the differing deck placement heights can all be standardized by using a combination of a section identifier and a height identifier on each MP 204. An example deck instruction would be as follows: ORIGIN: [MP identifier, section identifier, height identifier]-DESTINATION[MP identifier, section identifier, height identifier]. Such a deck instruction includes all necessary information to move a deck 336 from an origin to a destination.

Freight instructions may also be structured in a similar manner. However, more information may be needed in a freight instruction for both the origin and the destination. Similar to deck instructions, freight instructions may utilize a similar structure. A freight instruction may additionally include a quadrant location (using identifiers 342 and/or tags 344) location for further specificity. That is, the more information that can be provided to the cross-dock management system 200 about the particulars of the dock 202 and the particulars of moves, the more that can be automated.

As has already been described, the initial setup optimization 408 is able to divide instructions into worker instructions and AGV instructions using a variety of criteria. For example, because deck/MP instructions are simpler and MPs 204 and decks 336 are fairly large and standardized, only those moves may be automated while the other moves may be carried out by workers 108. Any combination of automation/manual moves are compatible with the present invention because the instructions are the same regardless. The only difference is the receiver of the instruction (worker 108 or AGV 114) and these instructions be rerouted on the fly by the real time instruction algorithms 422.

As another example, AGV server 448 may keep track of how many moves each AGV 114 has executed. If it is determined that a particular AGV 114 has been overburdened, this information may be supplied to real time instruction algorithms 422 so that the moves among AGVs 114 are distributed more evenly. This would allow the work load assigned to each AGV 114 to be balanced which would lead to less breakdowns and maintenance.

In some embodiment, individual pieces of freight may also be assigned unique identifiers to note special properties or allow them to be moved using an AGV. For example, some freight may be marked as delicate. Delicate freight is preferably manually loaded onto a deck 336 or a MP 204. For example, if freight is marked as delicate and there is enough delicate freight to fill a deck 336, the deck 336 may be loaded manually first and then an AGV 114 could be used to move the loaded deck 336 into a final position. It is a particular strength of the present invention that it can handle interruptions and automatically reroute the workflow around dock 202 to handle those interruptions (such as the needed loading of a manual deck 336). Also, since the system of the present invention knows the inbound manifest data, which would also include such freight indicators, the other instructions could be optimized to minimize the impact to workflow while the delicate freight (or other awkward freight) is being loaded manually.

The storage facility in which decks 336 are placed may take many forms. If there is a requirement for only occasional storage of decks 336 (e.g., delayed schedule or delivery, etc.), the storage area may simply be a portion of dock 202 having assigned spaces for decks 336. The cross-dock management system 200 would simply log the location of each placed deck 336, similar to the MPs 204, so that it could be recalled when needed. However, if a great number of decks 336 need to be stored, a rack system could be utilized in which a number of racks (e.g., composed of four posts 338) could be arranged on dock 202 or at a different location. Each rack would be assigned an identifier and the height that each deck is stored at would be noted by cross-dock management system for later recall of the deck. A rack system maximizes floor space. In particular, the racks could be placed against the walls of the dock 202 to minimize the floor space taken up.

Still, in another embodiment, the storage facility may be an entirely separate and automated facility if multiple decks 336 are to be stored long term. Such a facility would be useful, for example, for individuals traveling abroad that need to store items for long periods of time. Such individuals could be rented storage space in various sizes (an entire movable platform, a single deck, or combinations thereof) and those could be stored/retrieved at any time.

Figure 9:
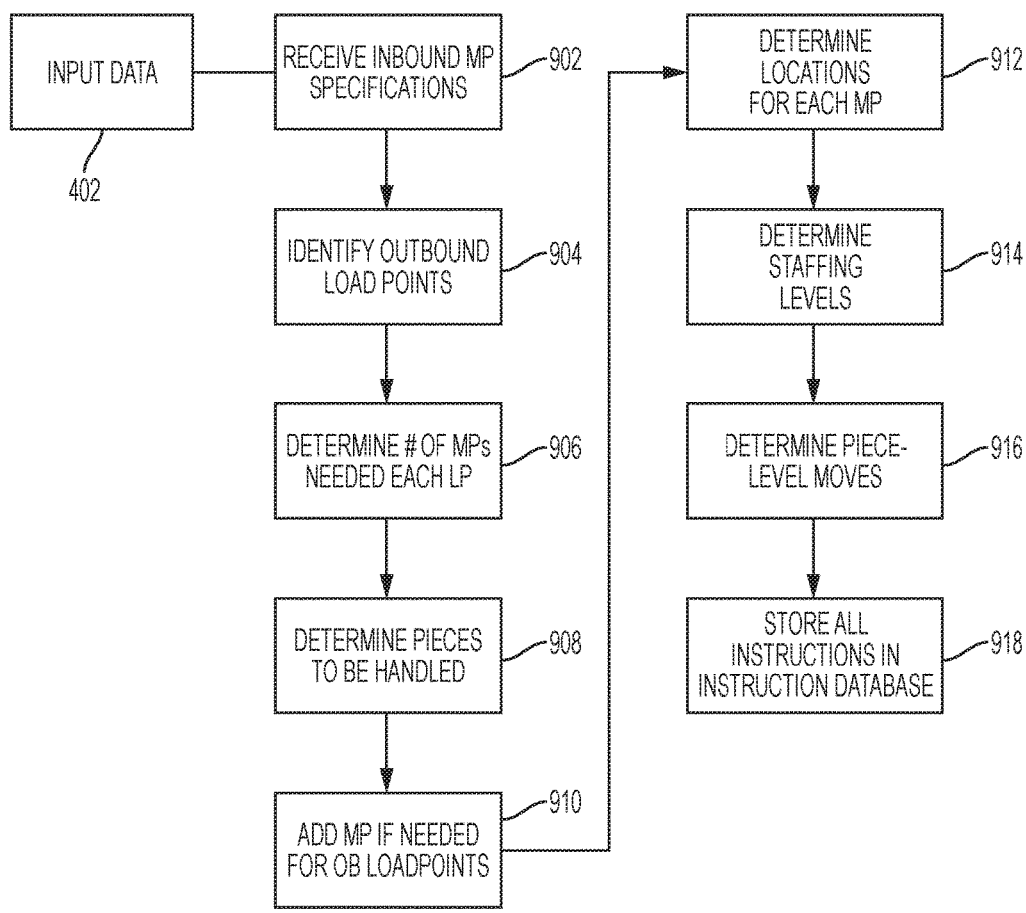
FIG. 9 depicts a flowchart showing the steps used to determine movement instructions for the movement database using input data.

FIG. 9 depicts a flowchart showing the steps utilized by initial setup optimization 408 to calculate instructions from input data 402. First, in step 902, the input data 402 is received and stored in local warehouse database 406. Based on the received manifests in input data 402, all outbound load points are identified by initial setup optimization 408 in step 904. Using this information, the number of MPs 204 for each load point can be determined in step 906. For example, an inbound MP 204 may have freight 112 or decks 336 which need to be transferred to three different destinations and would require at least two additional MPs 204 (i.e., because the inbound MP 204 is reused as an outbound MP 204 once it has been unloaded/reloaded).

Next, for each inbound MP 204, the initial setup optimization determines which freight 112 or decks 336 need to be handled in step 908. For example, if the majority of pieces on a MP 204 are intended for the same terminal 100, only a few select pieces need to be removed/loaded onto the MP 204 until it is ready to be loaded onto a waiting trailer 110. This can significantly speed up the loading/loading process over the conventional LIFO process. Similarly, if all of the freight 112 located on a deck 336 is intended for the same destination, only a single deck instruction needs to be calculated. If additional MPs 204 are needed, the initial setup optimization 408 adds additional MP movements to the instructions in step 910. Also, has already been described, additional MPs 204 can be placed overnight by AGVs 114 before any trailers 110 arrive.

If decks 336 and freight 112 are capable of being moved on dock 202, the initial setup optimization 408 will use a bin stacking algorithm to determine an optimal height at which each deck and/or freight 112 is to be placed during a deck or freight instruction. The initial setup optimization 408 calculates the deck instruction using the weight as well as the known dimensions (l×w×h) of each deck 336. As already noted, the real time instruction algorithms 322 can correct any wrong instructions which have been calculated during the initial setup optimization.

Based upon a plurality of criteria (weight, number of parcels, number of inbound/outbound MPs 204, number of pieces to be handled), the initial setup optimization 408 determines an optimized space 206 for each MP 204 on dock 202 in step 912. The initial setup optimization 408 also determines the number of workers 108 and/or AGVs 114 required to complete all necessary moves in step 914. This step avoids having too many or too few workers 108 or AGVs 114 located on dock 102.

Based upon the number of assigned workers 108 and AGVs 114 (step 914) and the number of pieces to be handled (step 908), the initial setup optimization 408 determines all piece level moves for the workers 108 and AGVs 114 (freight instructions and deck instructions) in step 916. The instructions are then stored in instructions database 410 in step 918. Step 902-918 are repeated daily for each set of input data 402 that is received by cross-dock management system 200.

In LTL shipping, shippers may desire to ship anywhere from a single piece of freight to an entire trailer, or anything in between. Therefore, for each shipper and pickup, it may be important to note and classify the shipments being picked up or dropped off at each facility. Further, this information will later be compiled into manifest data provided to each terminal 100 (and later used to calculate instructions and to route freight). Therefore, the more that is known about freight at the origin, the better the various cross-dock systems can manage the freight through the hub and spoke terminals 100. The following classifications of freight provided by a shipper at an original are possible:

A) Loose freight
B) Full deck with freight for (a) single destination or (b) multiple destination
C) Full MP with freight for (a) single destination or (b) multiple destinations
D) Multiple MPs with freight for (a) single destination or (b) multiple destination By classifying the pickups into these different categories, the origin dock 202 can better ascertain what equipment will be needed to conduct the first leg of the shipment (i.e., number of movable platforms needed, number of trailers needed). Further, classifying the information at pickup allows the freight 112 to be tagged at the earliest possible location (i.e., at pickup) and greatly reduces the possibility that freight 112 will be mislabeled or end up at the wrong terminal 100. For example, if it is noted early on that a MP 204 has freight intended for a single destination, the cross-dock management system 200 can route this MP 204 without having to calculate any deck instructions or freight instructions, thus reducing the complexity of the instruction calculations. Similarly, for decks 336 having freight for a single destination, only deck instructions have to be calculated.

Figure 10:
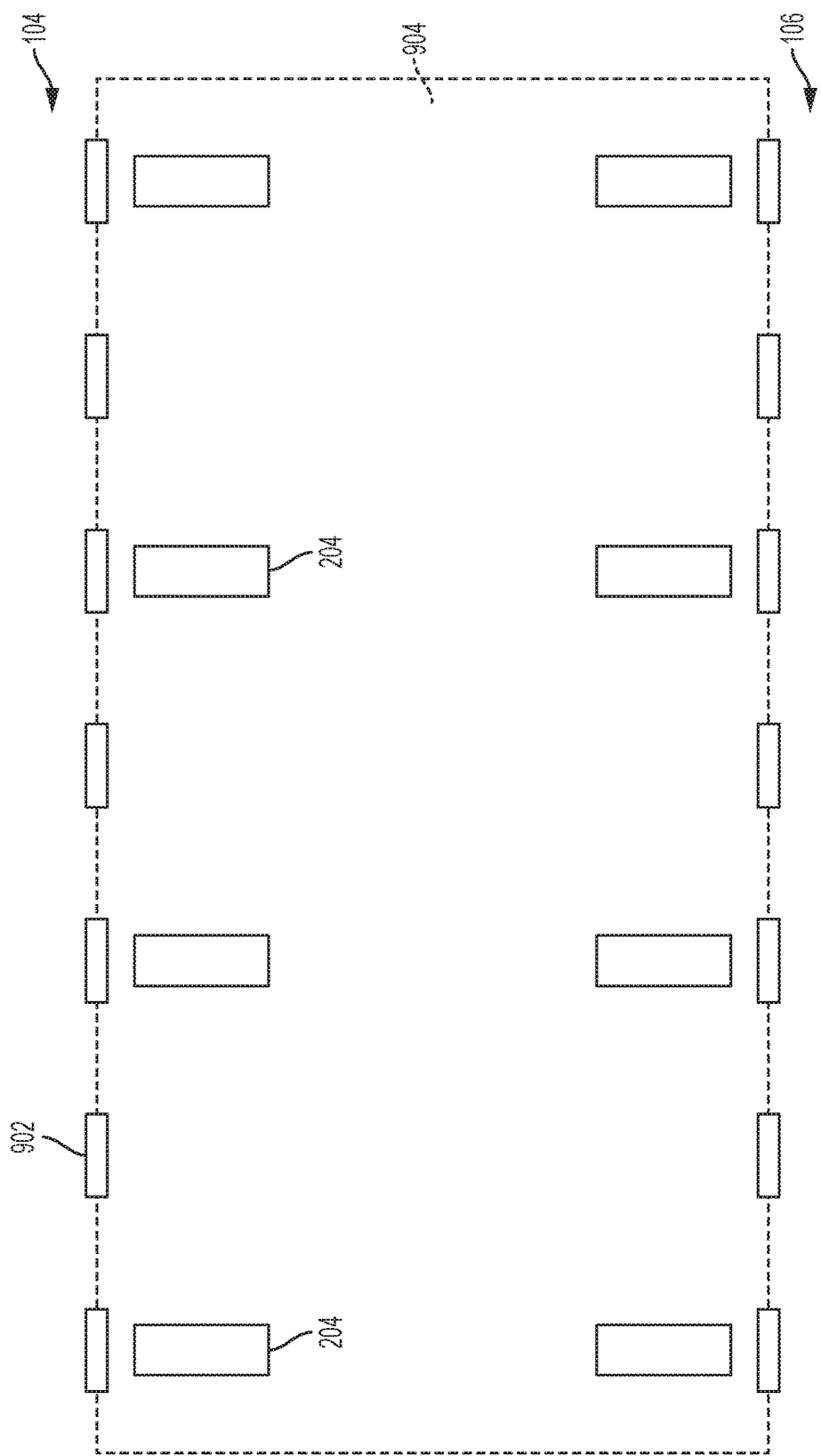
FIG. 10 depicts the dock of FIG. 1 configured to be used with movable platforms.

FIG. 10 depicts terminal 100 of FIG. 1 adapted for use with MPs 204. In some instances, it may not be feasible for an LTL shipper to modify the layout of dock 102. However, dock 102 can be made to be compatible with MPs 204 using the dock configuration shown in FIG. 10. As shown, MPs 204 are placed at every other door 902 to allow access to three sides of MP 204 both on the inbound doors 104 and outbound doors 106. This creates a central aisle 904 which allows for easy movement of MPs 204 and freight 112. It should be apparent to one of ordinary skill in the art that initial setup optimization 408 and real time instruction algorithms 422 can be adapted to work with the dock configuration shown in FIG. 10.

Figure 11:
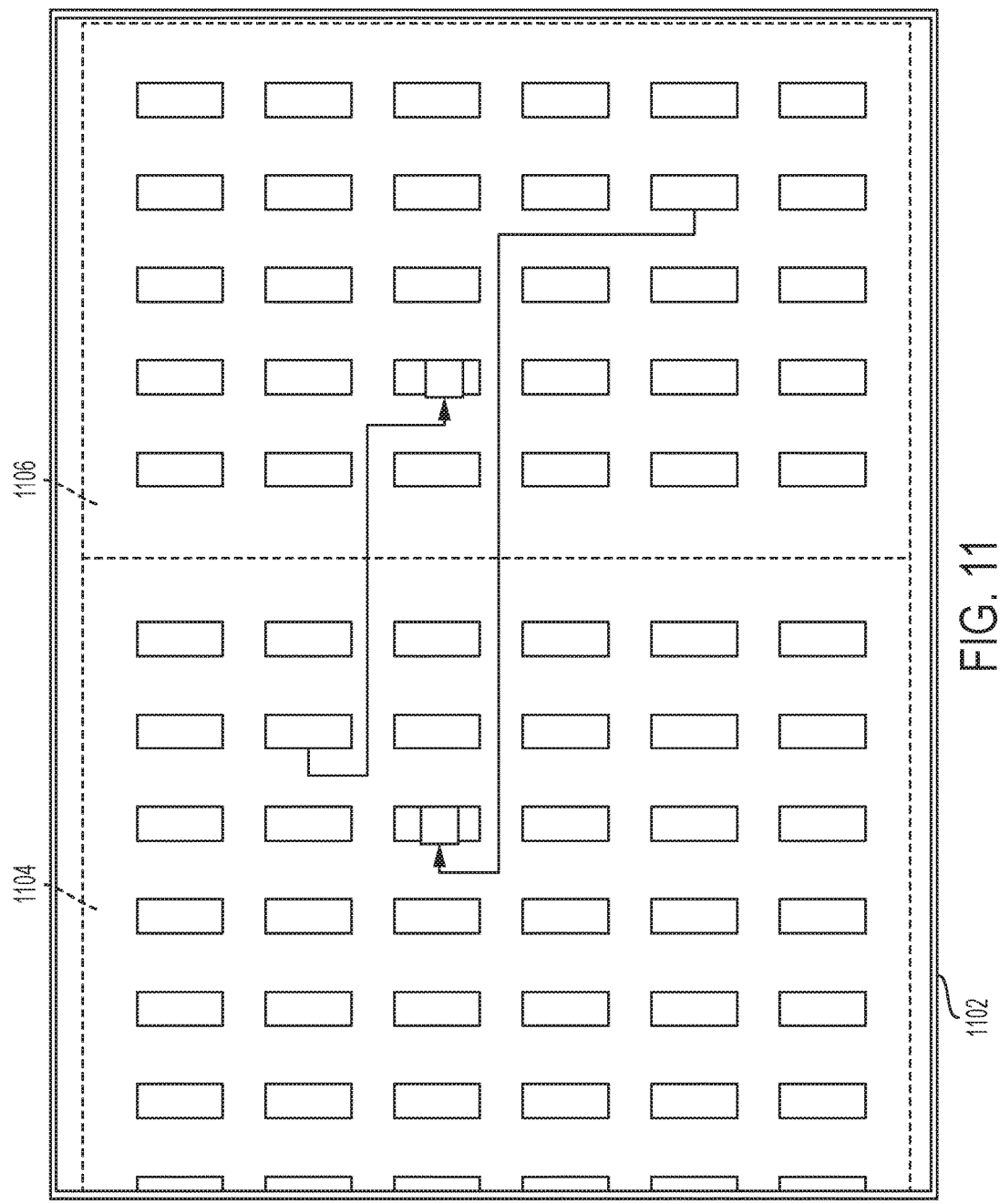
FIG. 11 depicts a shared optimized dock in accordance with the present invention.

FIG. 11 depicts a shared dock 1102 which is share between independent carriers located in the same geographical region that have a partnership for the purposes of sharing data. In such cases, predictive analytics can optimize loads by combining partner carrier freight (e.g., shipment parcels) onto the same MP 204, further reducing truck schedules and cost. As shown, a first side 1104 of dock 1102 is occupied by a first carrier and a second side 1106 of dock 1102 is occupied by a second carrier. First side 1104 and second side 1106 may be split equally or according to the terms of a partnership agreement. Information about MPs 204 and RFID tags can be made available from the first side 1104 to the second side 1106, and vice versa. However, each side 1104 and 1106 is preferably controlled by its own cross-dock management system 200 to provide data confidentiality. The two cross-dock management systems 200 may be linked in order to share limited data. As an example, the cross-dock management system 200 associated with first side 1104 may determine that it is more economically feasible to have the second side 1106 deliver certain parcels. The second side 1106 may agree or disagree to each request from first side 1104.

Figure 12:
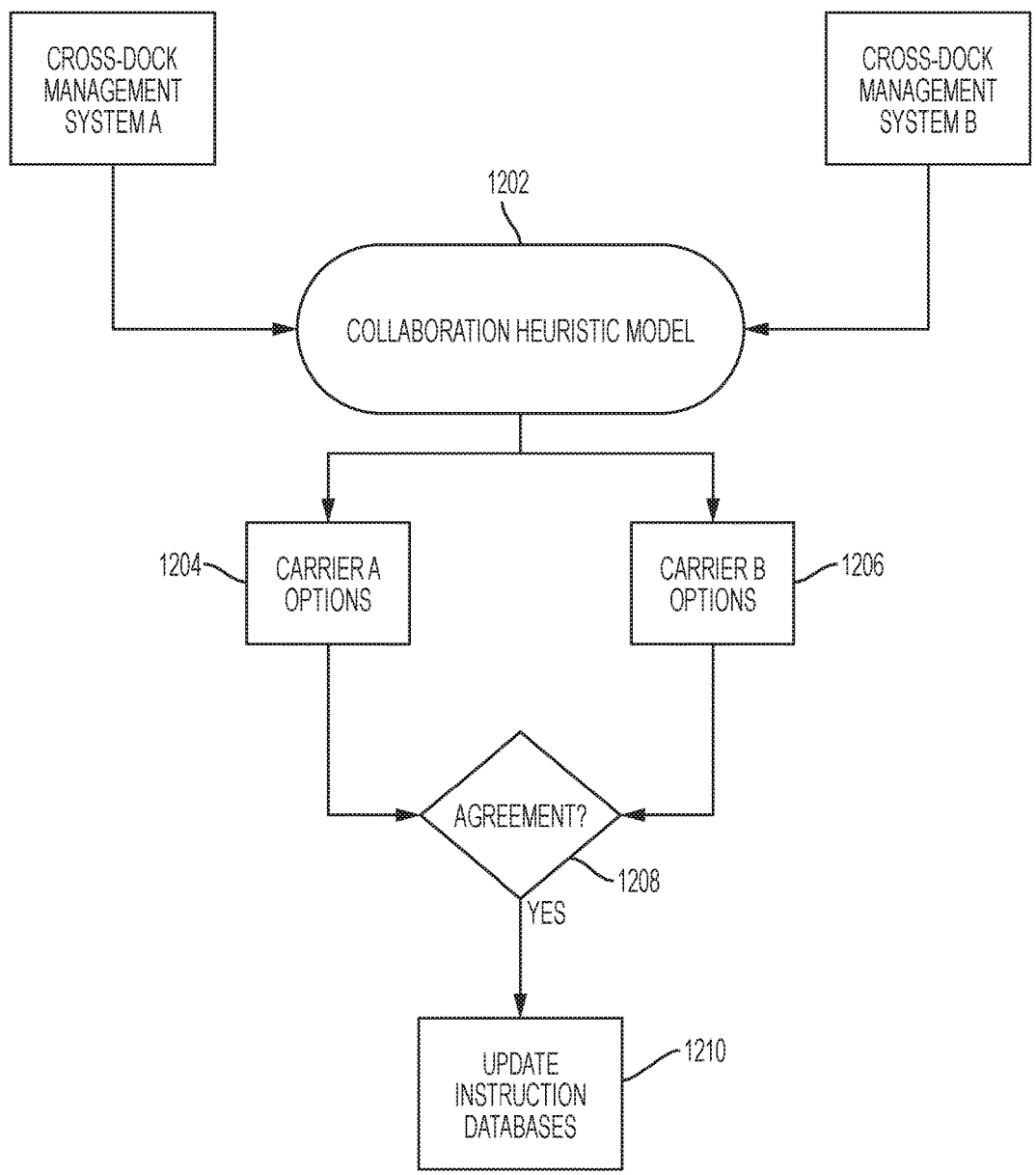
FIG. 12 depicts a flowchart showing the steps used when two or more shippers share the same optimized dock.

FIG. 12 depicts a flowchart showing the collaboration between two cross-dock management systems 200 which share dock 1002. The cross-dock management system 200 associated with first side 1104 is cross-dock management system A and the cross-dock management system 200 associated with first side 1104 is cross-dock management system B. Cross-dock management systems A and B each feed collaboration data into collaboration heuristic model 1202. Collaboration data may include information such as the number of available spaces on MPs 204, the destinations of all MPs 204, manifest data about any overflow freight 112 (i.e., a parcel which would require an extra shipment or does not fit within available MPs 204), etc. The collaboration heuristic model 1202 compares the collaboration data from cross-dock management systems A and B and determines options 1204 for carrier A and options 1206 for carrier B. Carrier A and Carrier B can agree/disagree to each option or cross-dock management systems A and B may be programmed to automatically accept/deny certain options in step 1208. Any options that agreed upon will be updated in the instructions database 410 as computed by real time instruction algorithms 422 in step 1210.

The above-cited patents and patent publications are hereby incorporated by reference in their entirety. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the invention may therefore be practiced otherwise than as specifically described above.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A cross-dock management system comprising:
a cross-dock having a plurality of doors at opposing ends of the cross-dock for receiving inbound trailers and for loading outbound trailers
a plurality of spaces arranged in a grid pattern on the cross-dock,
wherein the grid pattern comprises at least three rows and at least three columns, and
wherein the separated spaces are angled approximately 30-45° with respect to the plurality of doors;

a plurality of movable platforms arranged on the cross-dock in the separated spaces,
wherein an area of each movable platform is substantially the same as an area of the separated spaces;
wherein the plurality of movable platforms comprise:
a plurality of vertical posts; and
a plurality of engagement members on each vertical post configured to receive modular decks placed on the plurality of engagement members at varying heights;
a plurality of conveyance vehicles,
wherein a first subset of the plurality of conveyance vehicles are manually operated conveyance vehicles, and
wherein a second subset of the plurality of conveyance vehicles are automated guided vehicles (AGVs);
a local database for storing received manifest data,
wherein the manifest data includes information classifying inbound movable platforms, inbound modular decks, and inbound freight as AGV-compatible or AGV-incompatible; and
an initial setup optimization server for determining a plurality of ordered move instructions for moving the inbound movable platforms, the inbound modular decks, and the inbound freight based upon the manifest data,
wherein a first subset of the ordered move instructions are assigned to and performed by the AGVs, and
wherein a second subset of the ordered move instructions are assigned to and performed by the manually operated conveyance vehicles.

2. The cross-dock management system according to claim 1, further including:
a plurality of RFID readers arranged in an RFID array, and
a RFID server for collecting and storing real-time location information of the conveyance vehicles from the RFID array,
wherein the AGVs utilize the real-time location information for collision avoidance.

3. The cross-dock management system according to claim 1,
wherein each of the plurality of conveyance vehicles comprises a remote control unit, and
wherein the remote control unit is configured to allow a remote user or a remote control server to control each of the plurality of conveyance vehicles.

4. The cross-dock management system according to claim 1, wherein all ordered move instructions for the inbound movable platforms, the inbound modular decks, and the inbound freight classified as AGV-compatible are included in the first subset of the ordered move instructions.

5. The cross-dock management system according to claim 4, wherein all ordered move instructions for the inbound movable platforms, the inbound modular decks, and the inbound freight classified as AGV-incompatible are included in the second subset of the ordered move instructions.

6. The cross-dock management system according to claim 1, wherein each ordered move instruction includes origin information and destination information, wherein the destination information includes a movable platform location, a side of the movable platform location, a vertical post location, and a height location.

7. The cross-dock management system according to claim 6, wherein the second subset of the ordered move instructions are displayed to a worker using a tablet in communication with a manually operated conveyance vehicle operated by the worker.

8. The cross-dock management system according to claim 7, wherein each ordered move instruction is displayed using a visualization on a display of the tablet.

9. The cross-dock management system according to claim 8, wherein, for a freight instruction, the visualization includes a visual representation of a movable platform indicating a destination location of freight on a destination movable platform.

10. The cross-dock management system according to claim 1,
wherein each of the plurality of conveyance vehicles comprises one or more video cameras.

11. The cross-dock management system according to claim 10, further comprising:
a real time instruction server; and
a video server,
wherein the video server monitors video feeds from the one or more video cameras on each of the plurality of conveyance vehicles for damaged freight or misplaced freight, and
if any damaged freight or misplaced freight is detected, the video server transmits an exception to the real time instruction server.

12. The cross-dock management system according to claim 11, wherein the video server monitors video feeds from the one or more video cameras on each of the plurality of conveyance vehicles to detect unauthorized personnel, and
if any unauthorized personnel are detected, the video server
a) stores a video or an image of the unauthorized personnel; and
b) triggers a security alarm.

13. The cross-dock management system according to claim 11, wherein the real time instruction server utilizes exceptions to calculate a new set of ordered instructions for handling the damaged freight or the misplaced freight.

14. The cross-dock management system according to claim 13, wherein the new set of ordered instructions are added to the second subset of ordered move instructions.

15. The cross-dock management system according to claim 1, wherein the ordered move instructions are divided into movable platform instructions, modular deck instructions, and freight instructions.

16. The cross-dock management system according to claim 15, wherein all movable platform instructions are included in the first subset of the ordered move instructions.

17. The cross-dock management system according to claim 15, wherein all modular deck instructions are included in the first subset of the ordered move instructions.

18. The cross-dock management system according to claim 17, wherein all freight instructions are included in the second subset of the ordered move instructions.

19. The cross-dock management system according to claim 15, wherein the initial setup optimization server further comprises:
a dock zoning module,
wherein the dock zoning module assigns all movable platform instructions and all modular deck instructions to be carried out in a first zone of the cross-dock, and
wherein the dock zoning module assigns all freight instructions to be carried out in a second zone of the cross-dock different than the first zone.

20. The cross-dock management system according to claim 19, wherein only AGVs are assigned ordered move instructions included in the second zone of the cross-dock.

\* \* \* \* \*

UNITED STATES PATENT AND TRADEMARK OFFICE
CERTIFICATE OF CORRECTION

PATENT NO. : 10,147,059 B2
APPLICATION NO. : 15/798729
DATED : December 4, 2018
INVENTOR(S) : Sullivan et al.

Page 1 of 1

It is certified that error appears in the above-identified patent and that said Letters Patent is hereby corrected as shown below:

On the Title Page

Item (72), add:
Ryan Timmerman, Fort Smith, AR (US)

Signed and Sealed this
Twenty-second Day of September, 2020

Andrei Iancu
*Director of the United States Patent and Trademark Office*